(12) United States Patent
Yang et al.

(10) Patent No.: US 11,671,995 B2
(45) Date of Patent: Jun. 6, 2023

(54) TIME DOMAIN RESOURCE ALLOCATION-BASED HARQ-ACK FEEDBACK GENERATION

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 17/230,904

(22) Filed: Apr. 14, 2021

(65) Prior Publication Data

US 2021/0329645 A1 Oct. 21, 2021

Related U.S. Application Data

(60) Provisional application No. 63/011,979, filed on Apr. 17, 2020.

(51) Int. Cl.
*H04W 72/53* (2023.01)
*H04W 72/0446* (2023.01)
(Continued)

(52) U.S. Cl.
CPC ........... *H04W 72/53* (2023.01); *H04L 1/1819* (2013.01); *H04L 1/1896* (2013.01); *H04W 24/08* (2013.01);
(Continued)

(58) Field of Classification Search
CPC ............. H04W 72/0493; H04W 24/08; H04W 72/042; H04W 72/0446; H04L 1/1819; H04L 1/1896
See application file for complete search history.

(56) References Cited

U.S. PATENT DOCUMENTS

2019/0082431 A1\* 3/2019 Yi ......................... H04L 5/0057
2019/0149365 A1\* 5/2019 Chatterjee ............. H04L 5/0044
370/329

(Continued)

FOREIGN PATENT DOCUMENTS

WO 2019195715 A1 10/2019
WO WO-2019216620 A1 \* 11/2019 ........... H04L 1/1812

OTHER PUBLICATIONS

International Search Report and Written Opinion—PCT/US2021/027531—ISA/EPO—dated Jul. 26, 2021.
(Continued)

*Primary Examiner* — Jael M Ulysse
(74) *Attorney, Agent, or Firm* — Procopio, Cory, Hargreaves & Savitch LLP/Qualcomm

(57) ABSTRACT

This disclosure provides systems, devices, apparatus and methods, including computer programs encoded on storage media, for TDRA-based HARQ-ACK feedback generation. In aspects, a UE and a base station may determine that at least one TDRA candidate of a set of TDRA candidates for a PDSCH transmitted from a base station has more than one possible location within a slot. Based on the determination that the at least one TDRA candidate has more than one possible location within the slot, the UE may generate and transmit corresponding HARQ-ACK feedback to the base station, which may decode the HARQ-ACK feedback.

44 Claims, 13 Drawing Sheets

(51) Int. Cl.
  *H04W 24/08* (2009.01)
  *H04L 1/1812* (2023.01)
  *H04L 1/1867* (2023.01)
  *H04W 72/23* (2023.01)
(52) U.S. Cl.
  CPC ....... *H04W 72/0446* (2013.01); *H04W 72/23* (2023.01)

(56) References Cited

U.S. PATENT DOCUMENTS

| | | | | |
|---|---|---|---|---|
| 2019/0150123 A1* | 5/2019 | Nogami | ................ | H04L 5/0053 370/330 |
| 2020/0029315 A1* | 1/2020 | Lin | ................ | H04W 76/28 |
| 2020/0100284 A1* | 3/2020 | Li | ................ | H04W 74/0808 |
| 2020/0153560 A1* | 5/2020 | Park | ................ | H04L 5/0092 |
| 2020/0213046 A1* | 7/2020 | Wang | ................ | H04L 1/1861 |
| 2020/0213981 A1* | 7/2020 | Park | ................ | H04L 1/1864 |
| 2020/0213989 A1* | 7/2020 | Choi | ................ | H04L 5/0055 |
| 2020/0252168 A1* | 8/2020 | Kim | ................ | H04L 1/1819 |
| 2020/0337029 A1* | 10/2020 | Yi | ................ | H04W 72/042 |
| 2020/0351025 A1* | 11/2020 | Choi | ................ | H04L 5/0055 |
| 2020/0351955 A1* | 11/2020 | Jeon | ................ | H04W 74/006 |
| 2020/0358562 A1* | 11/2020 | Peng | ................ | H04L 5/0055 |
| 2020/0382174 A1* | 12/2020 | Shao | ................ | H04L 1/1861 |
| 2021/0099255 A1* | 4/2021 | Gao | ................ | H04L 5/0055 |
| 2021/0160829 A1* | 5/2021 | Park | ................ | H04L 1/1854 |
| 2021/0176762 A1* | 6/2021 | Islam | ................ | H04W 72/1289 |
| 2021/0218537 A1* | 7/2021 | Chen | ................ | H04L 1/1854 |
| 2021/0234643 A1* | 7/2021 | Wang | ................ | H04L 1/1822 |
| 2021/0314095 A1* | 10/2021 | Gao | ................ | H04L 1/1614 |
| 2022/0021505 A1* | 1/2022 | Ma | ................ | H04L 1/1887 |
| 2022/0053489 A1* | 2/2022 | Li | ................ | H04L 5/0094 |
| 2022/0086896 A1* | 3/2022 | Takahashi | ................ | H04W 72/1289 |
| 2022/0103325 A1* | 3/2022 | Chen | ................ | H04L 5/0023 |
| 2022/0159692 A1* | 5/2022 | Lee | ................ | H04L 1/1864 |
| 2022/0174667 A1* | 6/2022 | Lei | ................ | H04L 5/0094 |
| 2022/0224453 A1* | 7/2022 | Li | ................ | H04L 1/1812 |
| 2022/0255706 A1* | 8/2022 | Song | ................ | H04W 72/0446 |

OTHER PUBLICATIONS

Nokia, et al., "On PDCCH Enhancements for NR URLLC", 3GPP Draft, 3GPP TSG RAN WG1#99, R1-1912511, 3RD Generation Partnership Project (3GPP), Mobile Competence Centre, 650, Route Des Lucioles, F-06921, Sophia-Antipolis Cedex, France, vol. Ran WG1, No. Reno, NV, USA, Nov. 18, 2019-Nov. 22, 2019, Nov. 9, 2019 (Nov. 9, 2019), XP051823451, 23 pages, section 3.1.2, section 2.1.2.

* cited by examiner

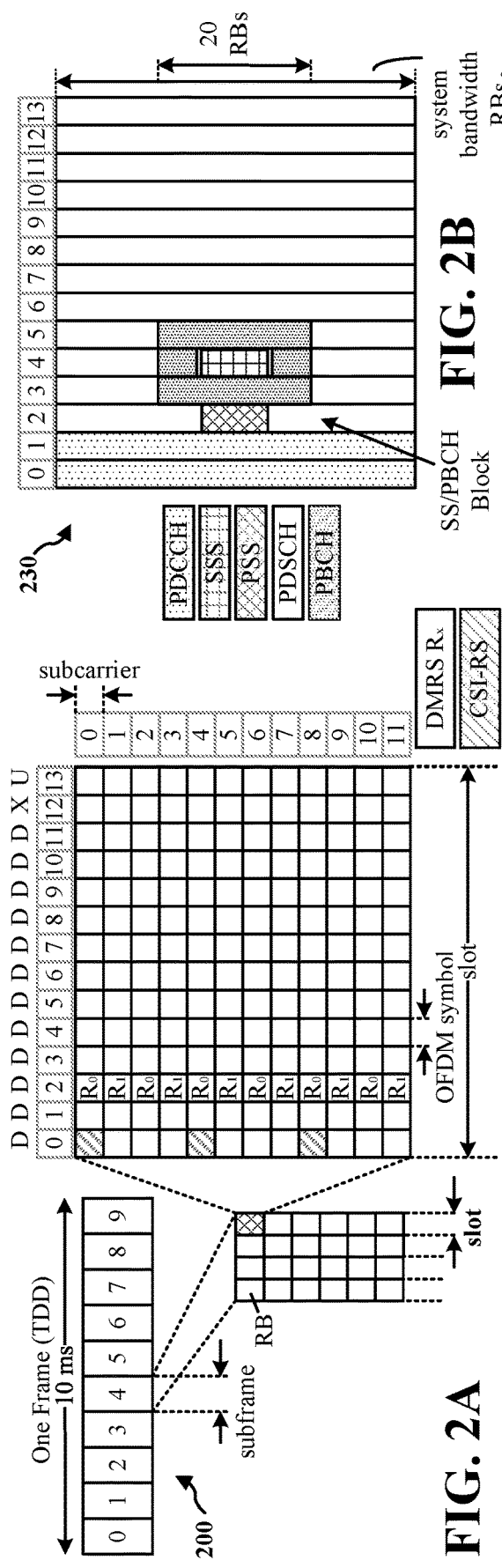
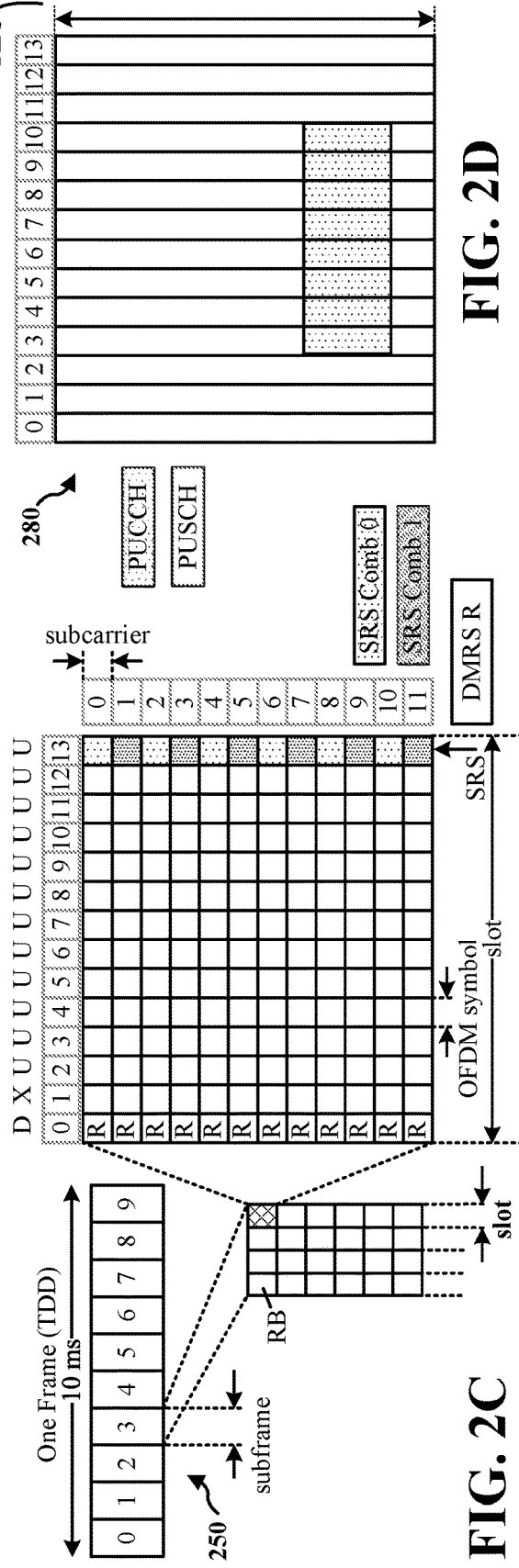
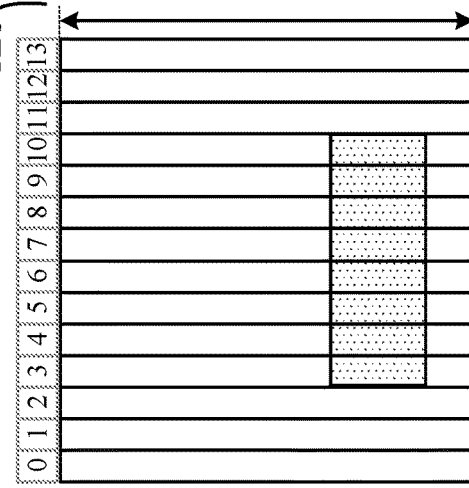
FIG. 2A
FIG. 2B
FIG. 2C
FIG. 2D

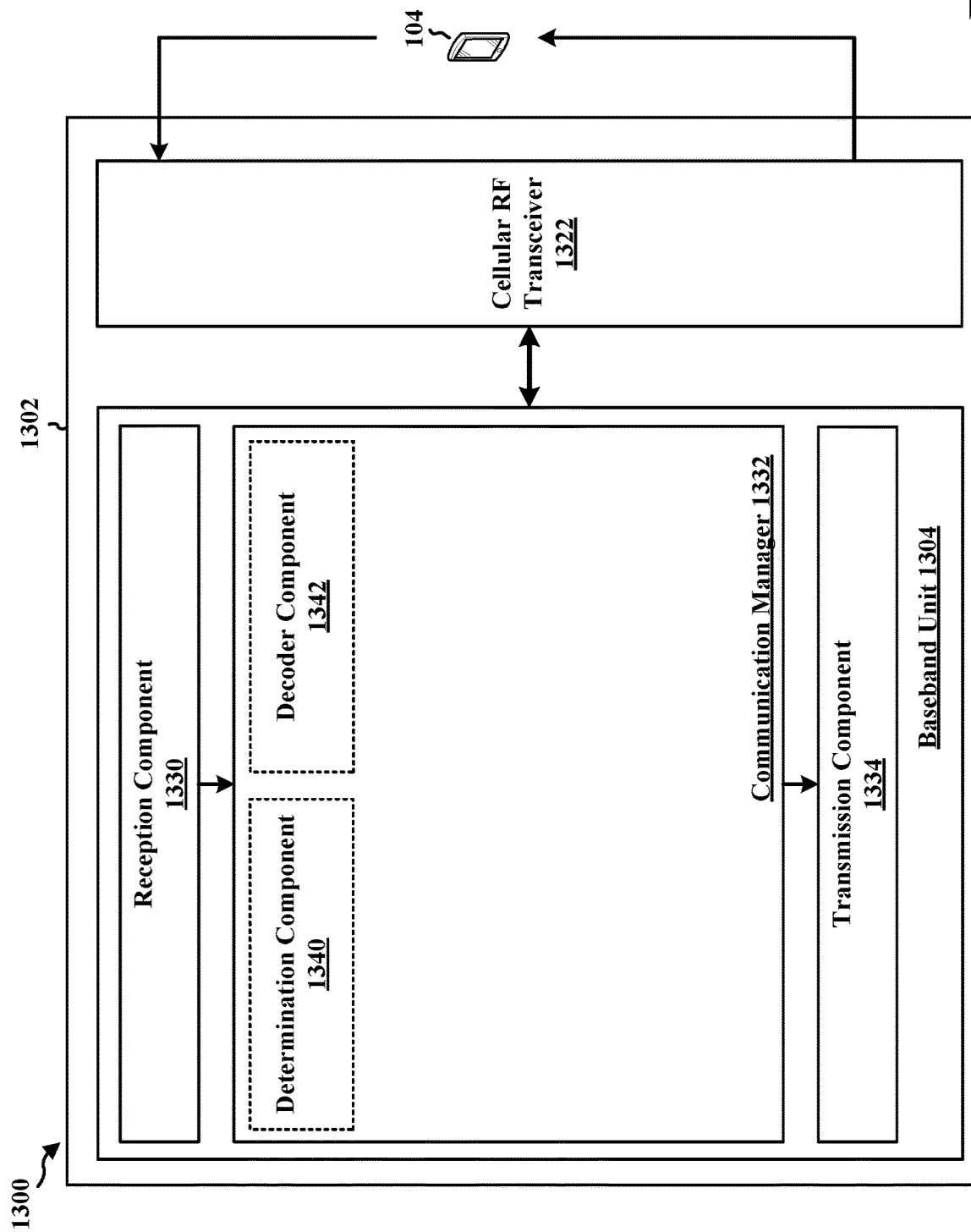

TIME DOMAIN RESOURCE ALLOCATION-BASED HARQ-ACK FEEDBACK GENERATION

CROSS REFERENCE TO RELATED APPLICATION(S)

This application claims the benefit of U.S. Provisional Application Ser. No. 63/011,979, entitled "Type 1 Codebook Determination for PDSCH with New Resource Allocation Reference" and filed on Apr. 17, 2020, which is expressly incorporated by reference herein in its entirety.

BACKGROUND

Technical Field

The present disclosure relates generally to communication systems, and more particularly, to hybrid automatic repeat request (HARD)-acknowledgment (ACK) (HARQ-ACK) feedback, such as a Type 1 codebook determination for a physical downlink shared channel (PDSCH) with an additional resource allocation reference.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A Type 1 hybrid automatic repeat request (HARD) acknowledgement (ACK) (HARQ-ACK) codebook may be constructed based on potential time-domain occurrences for a physical downlink shared channel (PDSCH) across downlink (DL) serving cells. A set of potential PDSCH occurrences for a slot may be determined based on a list of time-domain resource allocation (TDRA) values configured to a user equipment (UE), where the TDRAs that correspond to the values may be defined with respect to a start of the slot and, hence, are unique to the slot. For downlink control information (DCI) format 1_2, however, TDRAs may be defined with respect to a different reference point within the slot, such as a start of a physical downlink control channel (PDCCH) on which the DCI is detected. When the slot includes multiple PDCCHs, the values for defining a TDRA may be mapped to multiple locations within the slot such that the corresponding TDRA may not be unique within the slot.

Accordingly, when constructing the Type 1 HARQ-ACK codebook based on DCI format 1_2 and a reference point that is not based on the start of the slot, the UE may determine all the potential PDSCH occurrences within the slot for each respective set of TDRA values based on a number of PDCCH monitoring occasions within the slot and corresponding TDRA candidates that utilize the PDCCH monitoring occasions as reference points. A maximum number of non-overlapping TDRA candidates within the slot may be identified to determine a maximum number of potential PDSCH occurrences within the slot. Each of the PDSCH occurrences may then be mapped to a corresponding bit in the Type 1 HARQ-ACK codebook.

In an aspect of the disclosure, a method, a computer-readable medium, and an apparatus are provided. The apparatus may determine that at least one TDRA candidate of a set of TDRA candidates for receiving a PDSCH has more than one possible location within a slot; and generate HARQ-ACK feedback based on the determination that the at least one TDRA candidate has more than one possible location within the slot.

In another aspect of the disclosure, a method, a computer-readable medium, and an apparatus are provided. The apparatus may receive a first configuration for using a type 1 HARQ-ACK codebook for generating HARQ-ACK feedback, the first configuration being associated with a determination of a location of a PDSCH TDRA candidate based on a starting symbol of a slot, receive a second configuration indicating that DL PDSCH grants should be monitored within DCI format 1_2 messages, the second configuration being associated with a determination of the location of the TDRA candidate based on a starting symbol of one or more PDCCH monitoring occasions of a slot; and determine an error based on the first configuration and the second configuration being incompatible with each other.

In a further aspect of the disclosure, a method, a computer-readable medium, and an apparatus are provided. The apparatus may determine that at least one TDRA candidate of a set of TDRA candidates for receiving a PDSCH from a base station has more than one possible location within a slot; and generate HARQ-ACK feedback based on the determination that the at least one TDRA candidate has more than one possible location within the slot.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 13 is a diagram illustrating an example of a hardware implementation for an example apparatus.

DETAILED DESCRIPTION

Figure 1:
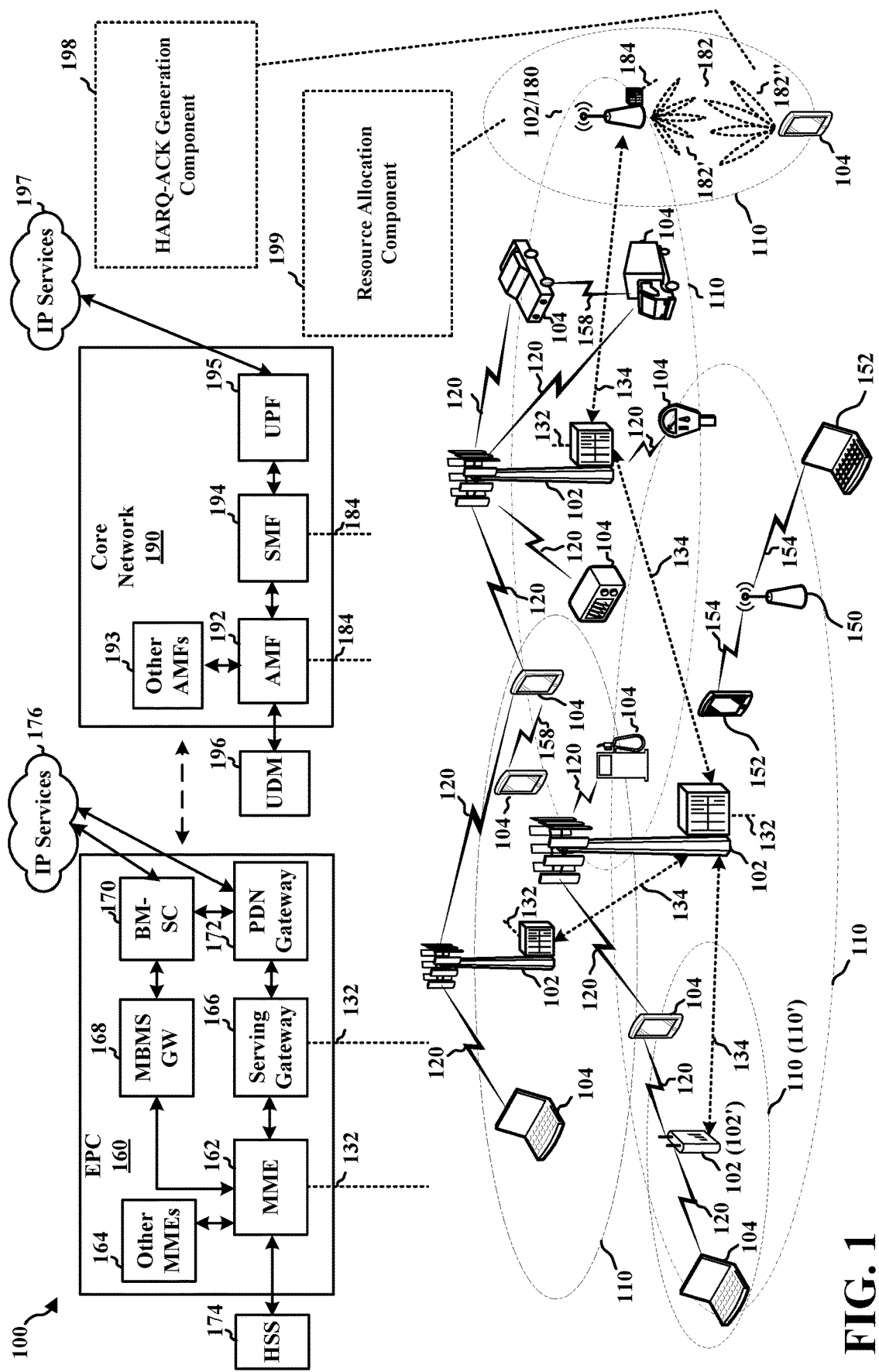
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a HARQ-ACK generation component 198 configured to determine that at least one TDRA candidate of a set of TDRA candidates for receiving a PDSCH has more than one possible location within a slot; and generate HARQ-ACK feedback based on the determination that the at least one TDRA candidate has more than one possible location within the slot. In certain aspects, the base station 180 may include a resource allocation component 199 configured to determine that at least one TDRA candidate of a set of TDRA candidates for receiving a PDSCH from a base station has more than one possible location within a slot; and generate HARQ-ACK feedback based on the determination that the at least one TDRA candidate has more than one possible location within the slot. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
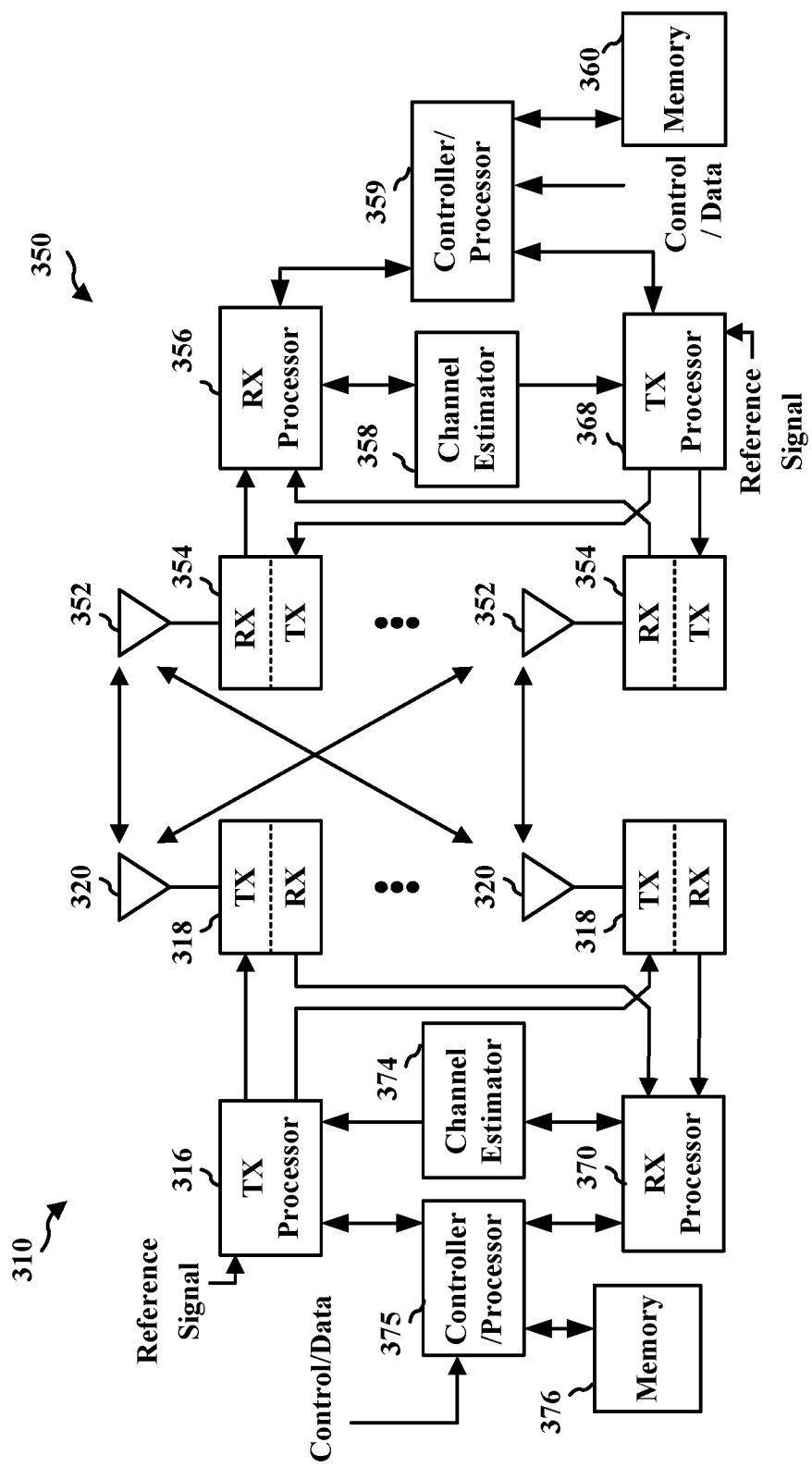
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the HARQ-ACK generation component 198 of FIG. 1.

At least one of the TX processor 316, the RX processor 370, and the controller/processor 375 may be configured to perform aspects in connection with the resource allocation component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
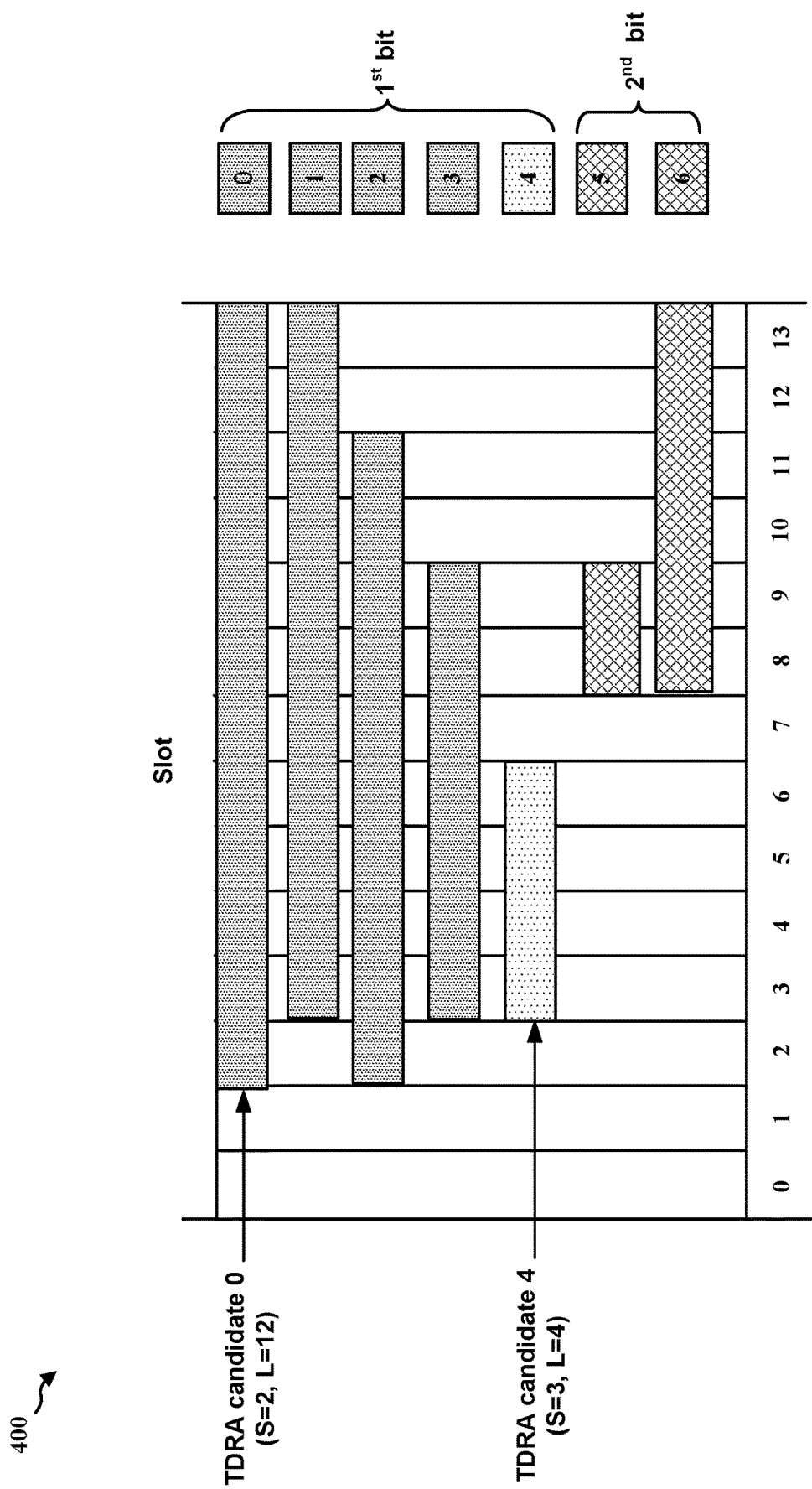
FIG. 4 is a diagram for constructing a HARQ-ACK codebook for generated HARQ-ACK feedback.

FIG. 4 is a diagram 400 for constructing a hybrid automatic repeat request (HARQ)-acknowledgement (ACK) (HARQ-ACK) codebook for generated HARQ-ACK feedback. In NR applications, two types of HARQ-ACK codebook construction techniques (e.g., Type 1 and Type 2) may be utilized by a UE to provide feedback to a base station. Type 1 HARQ-ACK codebooks, which may also be referred to as semi-static codebooks, may be constructed based on potential instances for which a PDSCH may occur in time-domain across DL serving cells. The UE may generate a set of HARQ-ACK bits such that each bit may correspond to a respective DL transmission and indicate whether the respective DL transmissions were received by the UE. The codebook may be constructed based on the HARQ-ACK bits that include HARQ-ACK feedback for the DL transmissions.

In aspects, the HARQ-ACK codebook may be constructed by identifying potential occurrences for the PDSCH that the base station may utilize to transmit a DL communication, and by determining a mapping of the DL communication to the potential occurrences. The potential occurrences for the PDSCH may be identified based on sets of time-domain resource allocations (TDRAs) configured from the base station to the UE. In a first example, a set of potential occurrences for the PDSCH may be determined based on a list/table of TDRAs that are defined with respect to a start of a slot. In this manner, each TDRA may be uniquely identified within the slot. In a second example, a DCI format may be used for the DL communication that defines a start of the TDRA with respect to a reference point (e.g., symbol) corresponding to a PDCCH on which the DCI is received, rather than from the start of the slot. As a result, a same TDRA may be mapped to multiple PDSCH locations within the slot, which may impact construction techniques for Type 1 HARQ-ACK codebooks. Accordingly, the multiple PDSCH locations for constructing the HARQ-ACK codebook may correspond to instances where the start of the TDRA is based on a reference point within the slot.

The diagram 400 includes a plurality of TDRA candidates 0-6 that extend over a number of OFDM symbols (e.g., symbol numbers 2-13) for scheduling a PDSCH. Each TDRA candidate 0-6 is defined by a start and length indicator value (SLIV). For example, TDRA candidate 0 starts at symbol 2 and has a length of 12 symbols. As another example, TDRA candidate 4 starts at symbol 3 and has a length of 4 symbols. In the diagram 400, the starting symbol for each of the TDRA candidates 0-6 may be defined with respect to the start of the slot, such that the UE may construct the HARQ-ACK codebook based on the TDRA candidates 0-6 being defined with respect to the start of the slot.

To construct a Type 1 HARQ-ACK codebook, the UE may identify a total number of TDRA candidates (e.g., TDRA candidates 0-6) configured for a given cell and, based thereon, determine a maximum number of non-overlapping PDSCHs that may be scheduled within the slot (e.g., a maximum of 2 PDSCHs may be non-overlapping in the diagram 400). The UE may generate HARQ-ACK bits based on the determined maximum number of non-overlapping PDSCHs. As illustrated in the diagram 400, the base station may transmit up to two PDSCHs within the slot, where a first PDSCH may be scheduled via TDRA candidate 4, and the second PDSCH may be scheduled via TDRA candidate 5 or TDRA candidate 6. The maximum number of non-overlapping TDRA candidates defines the maximum number of PDSCH transmissions that may occur in the slot.

The HARQ-ACK codebook may be constructed to determine a number of HARQ-ACK bits that may be indicated back to the UE. For example, if up to two non-overlapping PDSCH transmissions may occur in the slot, there may be two HARQ-ACK bits. In aspects, predefined protocols may be executed to determine the number of HARQ-ACK bits, and to further determine how each of the TDRA candidates 0-6 may be mapped to the HARQ-ACK bits. When a subset of the total number of TDRA candidates is mapped to a same bit (e.g., TDRA candidates 0-4 being mapped to the $1^{st}$ bit, or TDRA candidates 5-6 being mapped to the $2^{nd}$ bit), only one of the TDRA candidates in the subset may be utilized at a given time to schedule the PDSCH.

Although there are seven potential TDRA candidates 0-6 for receiving the PDSCH in the diagram 400, two TDRA candidates, at most (e.g., a first TDRA candidate corresponding to the first bit and a second TDRA candidate corresponding to the second bit), may be used for the PDSCH. In further aspects, only one of the TDRA candidates in the diagram 400 (e.g., TDRA candidates 0-3) may be used for the PDSCH. For example, if the base station schedules a PDSCH transmission via TDRA candidate 3, none of the other TDRA candidates 0-2 and 4-6 may be used for transmitting another PDSCH, as the other TDRA candidates 0-2 and 4-6 each overlap with the TDRA candidate 3. Thus, one PDSCH transmission may occur in the slot under such conditions.

Accordingly, the UE may identify which of the TDRA candidates 0-6 overlap with each other and group the overlapping TDRA candidates into one bit, as only one TDRA candidate in the overlapping group of TDRA candidates may be used to transmit the PDSCH. The overlapping TDRA candidates that correspond to a HARQ-ACK bit may be set to a same location in the HARQ-ACK codebook. The UE may determine a mapping of the TDRA candidates 0-6 to the number of bits based on the number of TDRA candidates configured from the base station to the UE.

Figure 5:
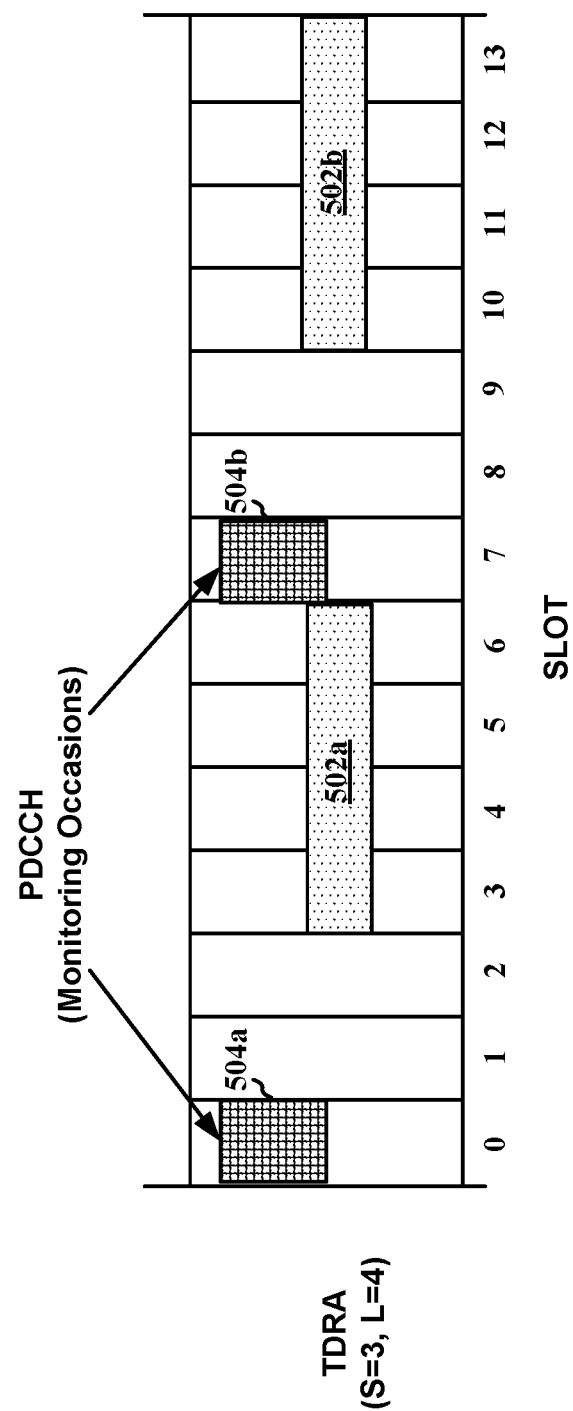
FIG. 5 is a diagram including a TDRA defined from a start of a PDCCH monitoring occasion.

FIG. 5 is a diagram 500 where a TDRA 502a-b defined from a start of a PDCCH monitoring occasion maps to multiple locations within a slot. In other words, a reference point for defining the TDRA 502a-b may not be based on the start of the slot. For example, the TDRA 502b may be indicated to the UE based on a SLIV that includes S=3, L=4, where a start of the TDRA 502b may be defined with respect to a location of the PDCCH 504b on which the grant for the PDSCH is decoded/communicated. For example, depending on where the DL grant is transmitted in the slot, the UE may determine that a TDRA 502a-b of (S=3, L=4) may begin with respect to the PDCCH 504a-b at either symbol 3 or symbol 10 for transmitting OFDM data over a length of 4 symbols. That is, for the second PDCCH 504b, S=0 may correspond to the symbol that includes the second PDCCH monitoring occasion (e.g., symbol 7), rather than the beginning of the slot (e.g., symbol 0). Defining the TDRA 502a-b in a slot that includes more than one PDCCH monitoring occasion may, thus, provide more than one possible starting point for the TDRA 502a-b, which may further impact a construction technique for the corresponding HARQ-ACK codebook.

A RRC parameter may be used to indicate whether the SLIV is associated with a start of the slot or a reference point (e.g., PDCCH monitoring occasion) within the slot. When the SLIV is associated with a reference point within the slot, the reference point may be utilized for defining TDRAs in which $K_0=0$ (e.g., where the DL control information and the DL data for the TDRA occur in the same slot). When $K_0$ is equal to a value other than 0, the TDRA is located in a different slot than that of the PDCCH used as the reference point for the TDRA. For example, $K_0=1$ indicates that the TDRA is in a next slot after the PDCCH that is used as the reference point for the TDRA. While TDRAs with $K_0>0$ may be included in a same TDRA table as the TDRAs with $K_0=0$, SLIVs associated with TDRA reference points may be applied to TDRAs with $K_0=0$ for DCI format 1_2. SLIVs for other TDRAs in the same TDRA table, if any, may alternatively be based on the start of the slot. Thus, to determine the resource allocation, the UE may not only identify where in the slot the data may be received, but also in which slot the data may be transmitted.

Figure 6:
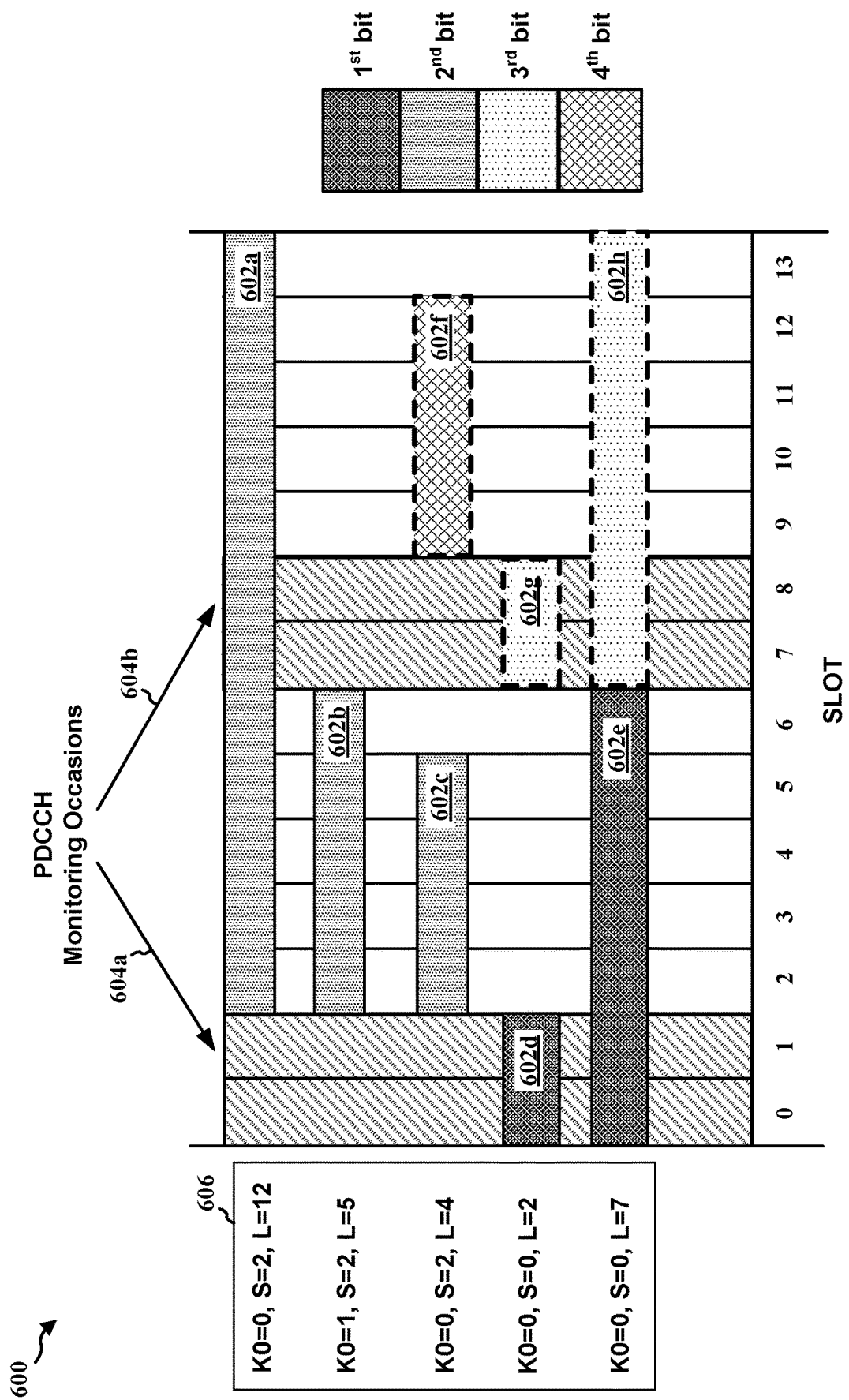
FIG. 6 is a diagram for determining potential PDSCH occurrences within a slot for respective TDRAs.

FIG. 6 is a diagram 600 for determining potential PDSCH occurrences within a slot for each respective TDRA. The UE may construct the Type 1 HARQ-ACK codebook by monitoring for DCI format 1_2 to schedule HARQ-ACK feedback in the codebook based on a reference point for the TDRA indicated via DCI format 1_2. In some cases, the UE may construct two HARQ-ACK codebooks, which may be of a same type (e.g., both Type 1) or of different types (e.g., a first codebook may be Type 1 and a second codebook may be Type 2). The construction of the two HARQ-ACK codebooks may be used to address different reliability and latency requirements by the UE. For example, a first codebook may be used for URLLC and a second codebook may be used for eMBB. In aspects, DCI format 1_2 may be used to schedule URLLC transmissions and, hence, the UE may use the reference point approach for the HARQ-ACK codebook associated with URLLC. The UE may also construct the second codebook for eMBB based on another approach, even though eMBB traffic may not be scheduled by DCI format 1_2, but by other DCI formats. Accordingly, the UE may apply the PDCCH monitoring occasion/reference point procedure to codebooks that may be scheduled by DCI format 1_2.

In aspects, the UE may determine a number of PDCCH monitoring occasions 604a-b within the slot for which the UE may monitor for DCI format 1_2. The UE may also determine a number of TDRAs 602a-h that utilize the PDCCH monitoring occasions 604a-b as a reference point within the slot (e.g., where $K_0=0$). Based on the number of PDCCH monitoring occasions 604a-b and the number of TDRAs 602a-h that utilize the PDCCH monitoring occasions 604a-b as the reference point, the UE may determine a total number of potential PDSCH occurrences within the slot for each TDRA 602a-h. Upon determining the total number of potential PDSCH occurrence, the UE may construct the Type 1 HARQ-ACK codebook based on determining a maximum number of non-overlapping potential PDSCH occurrences within the slot, and determining a mapping of each potential PDSCH occurrence to a corresponding bit in the HARQ-ACK codebook.

Type 1 HARQ-ACK codebooks may not be dependent upon DCI received by the UE. Codebook sizes may be fixed via RRC configuration. As long as the UE is configured to monitor for DCI format 1_2, the UE may construct the codebook based on potential PDSCH occurrences regardless of whether the UE receives a transmission based on DCI format 1_2 or a different DCI format. Thus, in order to construct the codebook, the UE may monitor for DCI format 1_2 at certain locations in the slot, even if the base station does not generate a transmission based on DCI format 1_2 at all of the monitored locations. As long as the UE is configured to monitor for DCI format 1_2, the UE may initiate the procedure for determining the potential PDSCH occurrences within the slot, such that the UE may construct the codebook based on the determined potential PDSCH occurrences.

In the diagram 600, the UE may be configured with two PDCCH monitoring occasions 604a-b in a single slot, where the UE may monitor for DCI format 1_2 in both of the monitoring occasions 604a-b. A corresponding TDRA table 606 in the diagram 600 includes 5 TDRA SLIVs—four of which have $K_0=0$ and one which has $K_0=1$. For the SLIV having $K_0=1$, only one potential PDSCH occurrence may be associated with the SLIV, which may be indicated with respect to the beginning of the slot. For the SLIVs having $K_0=0$, there may be multiple TDRA candidates for potential PDSCH occurrences, provided that the TDRA candidates 602-f-h that correspond to the second PDCCH monitoring occasion do not extend outside the slot (e.g., beyond symbol 13). For example, the TDRA candidate 602a having ($K_0=0$, S=12, L=12) includes one potential PDSCH occurrence corresponding to the first PDCCH monitoring occasion 604a, as defining such TDRA 602a with respect to the second TDRA monitoring occasion 604b would cause the TDRA 602a to extend outside the slot (e.g., beyond symbol 13).

The codebook constructed by the UE may be based on a number of consecutive slots. Thus, the diagram 600 may be constructed based on all of the identified locations of the TDRAs 602a-h in the number of consecutive slots. To determine the number of potential TDRA candidates 602a-h, the UE may disregard the TDRA 602b having $K_0=1$ when identifying additional candidates for the TDRA 602b. That is, the UE may determine whether a TDRA candidate may be scheduled multiple times in the slot based on the TDRA candidate having $K_0=0$. While two PDCCH monitoring occasions 604a-b are illustrated in the diagram 600 as an example, other slot configurations may include a different number of PDCCH monitoring occasions (e.g., 3 monitoring occasions, 4 monitoring occasions, etc.). If the number of PDCCH monitoring occasions within the slot is greater than two, the multiple TDRA candidates 602f-h may be respectively associated with further/subsequent multiple TDRA candidates. For example, the UE may be able to derive, via the TDRA table 606, more than one additional TDRA candidate for potential PDSCH occurrences from an individual TDRA candidate, such as the TDRA candidates 602c-e.

Figure 7:
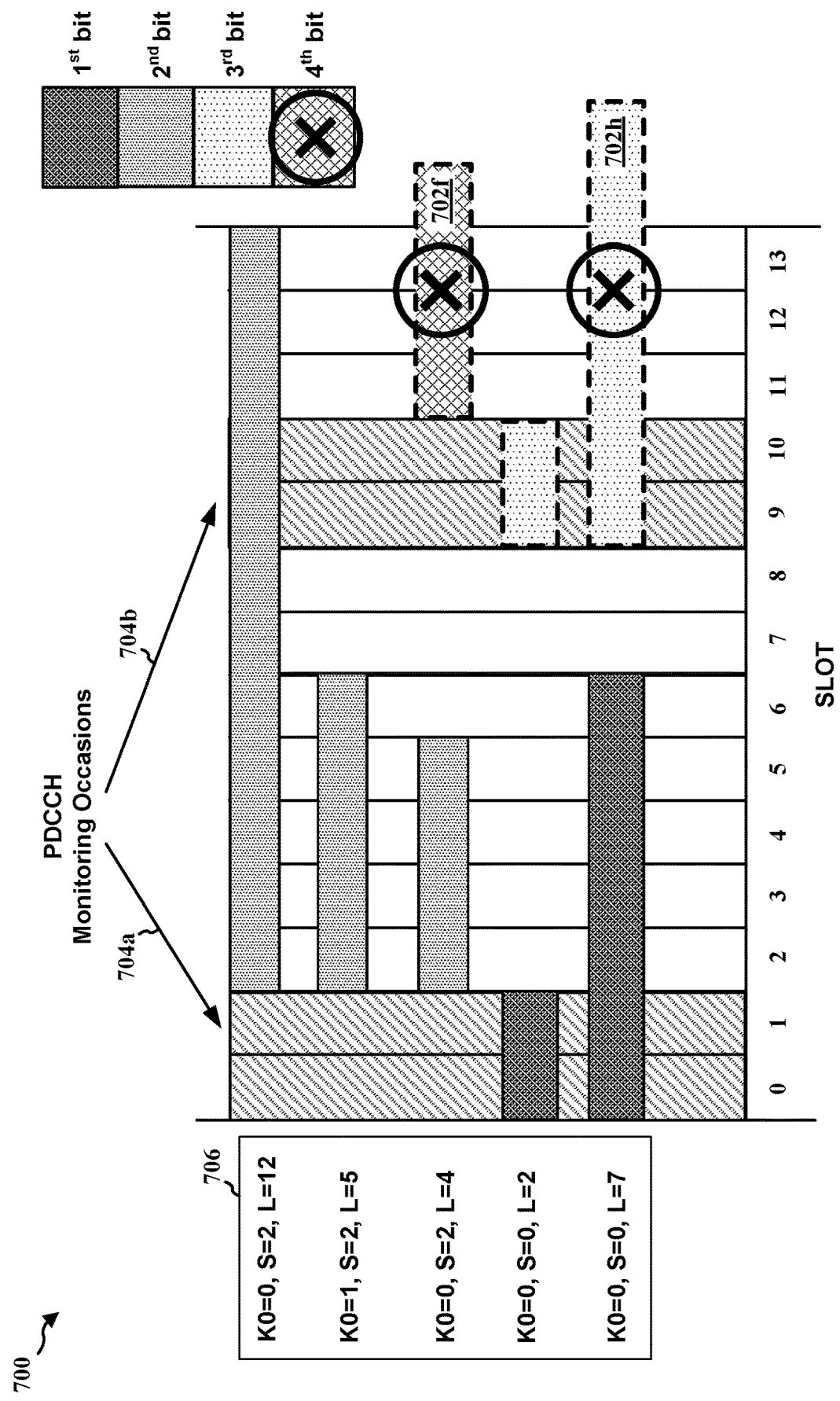
FIG. 7 illustrates potential PDSCH occurrences within the slot based on a shifted PDCCH monitoring occasion.

In other examples, such as in the diagram 700 of FIG. 7, one or more of the PDCCH monitoring occasions 704a-b may be shifted such that the number of potential PDSCH occurrences and/or bits may be changed. FIG. 7, for example, illustrates that if the second PDCCH monitoring occasion 604b in the diagram 600 is shifted ahead by two symbols (e.g., the second PDCCH monitoring occasion 604b/704b is shifted from symbols 7-8 to symbols 9-10), the diagram 700 no longer includes a $4^{th}$ bit, as the multiple/second TDRA candidates 702f and 702h derived from the corresponding TDRA table 706 would extend outside the slot, and are thus eliminated from consideration as potential PDSCH occurrences.

Referring again to FIG. 6, for the four TDRA candidates 602a and 602c-e with $K_0=0$, the latter three TDRA candidates 602c-e derived from the TDRA table 606 may have additional potential PDSCH occurrences that may be scheduled with respect to the second PDCCH monitoring occasion 604b. Therefore, the UE may determine that there are 8 potential PDSCH occurrences within the slot, which may correspond to the 5 TDRA candidates 602a-e scheduled with respect to the first PDCCH monitoring occasion 604a and the 3 additional TDRA candidates 602f-h scheduled with respect to the second PDCCH monitoring occasion 604b, based on the number of PDCCH monitoring occasions in the slot and the values of $K_0$, S, and L maintaining the additional TDRA candidates 602f-h completely within the slot.

After the UE determines the potential number of TDRA candidates 602a-h, the UE may construct the HARQ-ACK codebook based on the maximum number of PDSCH transmissions that may be transmitted in the slot. In the diagram 600, up to four PDSCHs may be transmitted in the slot based on having, at most, four TDRA candidates 602c-d and 602f-g that are non-overlapping. Accordingly, by identifying TDRAs 602c-e that may have multiple TDRA candidates 602f-h, the slot illustrated in the diagram 600 may be configured based on two additional bits (e.g., a $3^{rd}$ bit and a $4^{th}$ bit, rather than only the $1^{st}$ bit and the $2^{nd}$ bit).

In further examples, the UE may not be configured with both the monitoring occasion/reference point for the PDSCH resource allocation for DCI format 1_2 and the Type 1 HARQ-ACK codebook at the same time for a particular DL serving cell. That is, the UE may receive a first configuration that a Type 1 HARQ-ACK codebook is used for a DL serving cell and a second configuration that a TDRA indicated in DCI format 1_2 on the DL serving cell is defined with respect to a PDCCH monitoring occasion, such that the UE may determine that a scheduling/configuration error occurs based on the first configuration and the second configuration not being compatible with each other.

Figure 8:
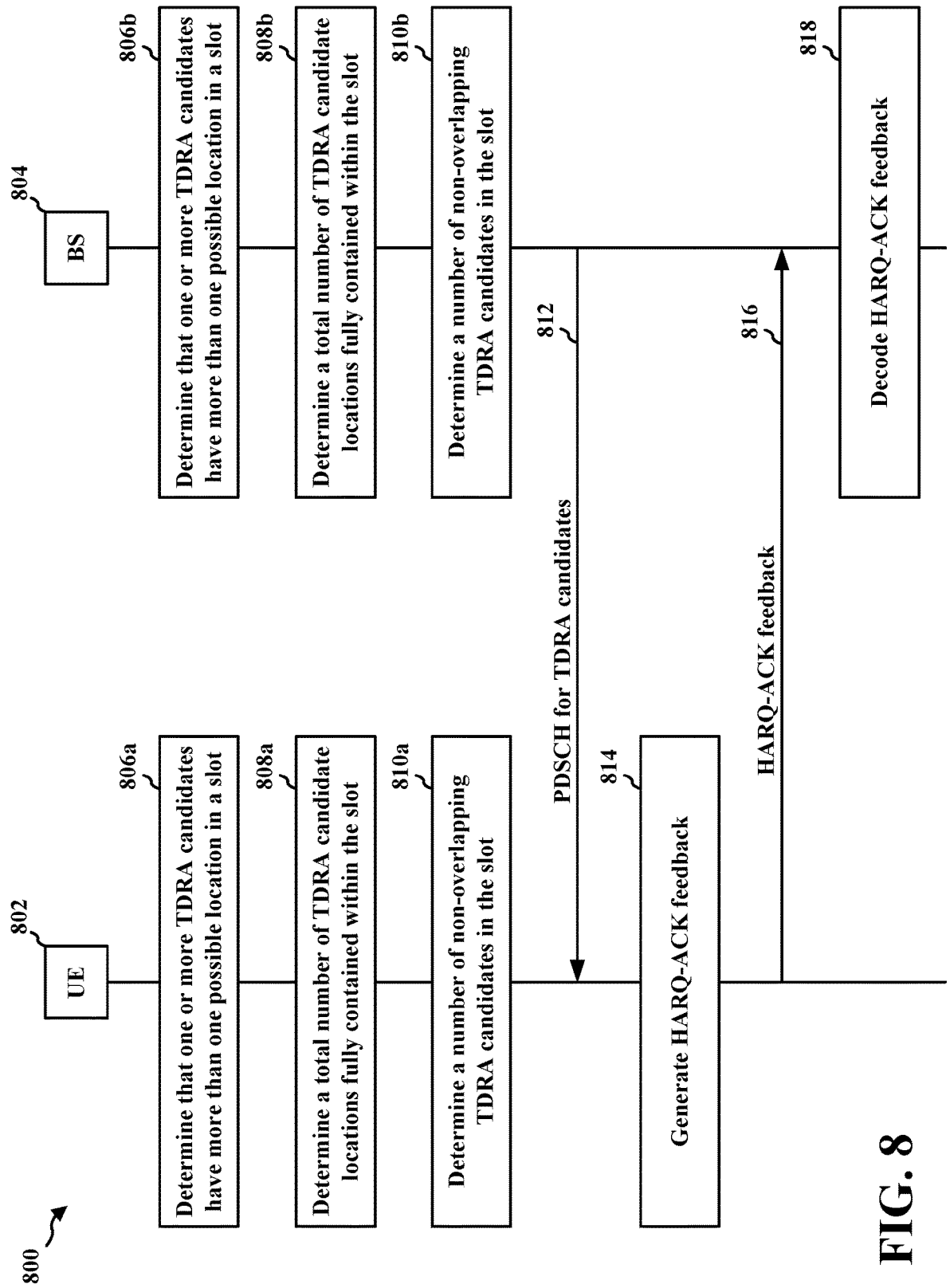
FIG. 8 is a call flow diagram illustrating communications between a UE and a base station.

FIG. 8 is a call flow diagram 800 illustrating communications between a UE 802 and a base station 804. At 806a-806b, the UE 802 and the base station 804 may each determine that one or more TDRA candidates have more than one possible location in a slot. For instance, in slots that include multiple PDCCH monitoring occasions, a first TDRA candidate may correspond to a first PDCCH monitoring occasion, and a second TDRA candidate may correspond to a second PDCCH monitoring occasion (e.g., when a starting symbol number of the second TDRA candidate plus a number of symbols corresponding to a length of the second TDRA candidate is less than or equal to a number of symbols included in the slot).

At 808a-808b, the UE 802 and the base station 804 may each determine a total number of TDRA candidate locations that are fully contained within the slot. For example, some TDRA candidates may have only one possible location within the slot, and other TDRA candidates may have more than one possible location within the slot. Thus, the total number of TDRA candidate locations determined, at 808a-808b, may correspond to a first number of TDRA candidates that have more than one possible location within the slot, a second number of TDRA candidates corresponding to the additional locations of the first number of TDRA candidates, and a third number of TDRA candidates that have only one possible location within the slot.

At 810a-810b, the UE 802 and the base station 804 may each determine a number of non-overlapping TDRA candidates within the slot, based on the total number of TDRA candidates determined, at 808a-808b. The number of non-overlapping TDRA candidates determined, at 810a-810b, may be a maximum number of non-overlapping TDRA candidates within in the slot, where the maximum number of non-overlapping TDRA candidates may be determined based on the total number of TDRA candidates determined, at 808a-808b.

At 812, the base station 804 may transmit PDSCH to the UE 802 for one or more of the TDRA candidates included in the slot. The UE 802 may generate, at 814, HARQ-ACK feedback for the one or more TDRA candidates based on the PDSCH received, at 812, from the base station 804. At 816, the UE 802 may transmit the generated HARQ-ACK feedback to the base station 804 based on a constructed HARQ-ACK codebook. At 818, the base station 804 may decode the HARQ-ACK feedback received, at 816, from the UE 802.

Figure 9:
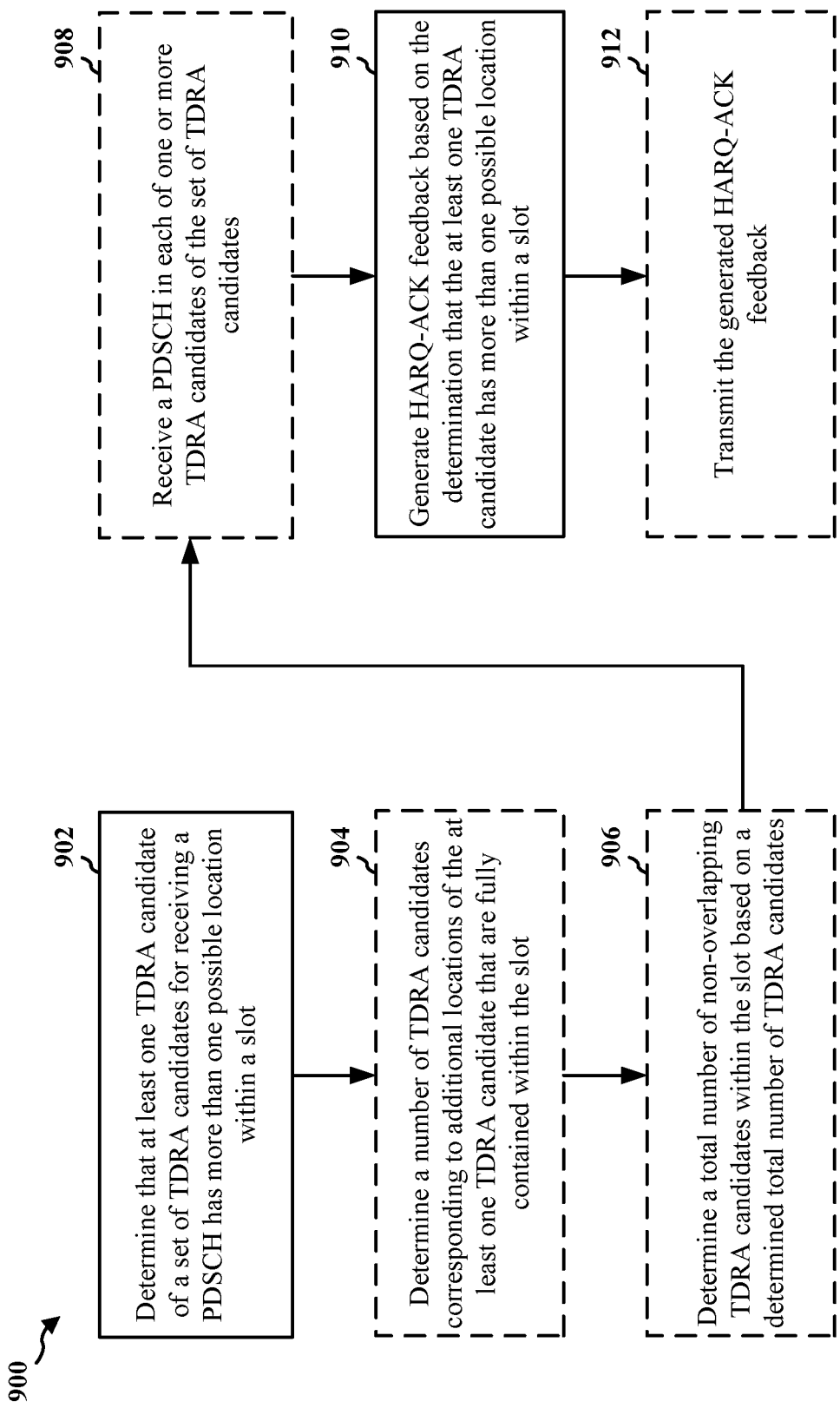
FIG. 9 is a flowchart for a method of wireless communication at a UE.

FIG. 9 is a flowchart 900 of a method of wireless communication. The method may be performed by a UE 104, which may include the memory 360 and which may be the entire UE 104 or a component of the UE 104, such as the TX processor 368, the RX processor 356, and/or the controller/processor 359.

At 902, the UE may determine that at least one TDRA candidate of a set of TDRA candidates for receiving a PDSCH has more than one possible location within a slot. For example, referring to FIG. 6, the TDRA candidates 602c-e and 602f-h included in the diagram 600 may be defined with respect to a start of the first monitoring occasion 604a at symbol 0 and with respect to a start of the second monitoring occasion 604b at symbol 7.

The determination that the at least one TDRA candidate has more than one possible location within the slot may be further based on: determining that the UE is configured to monitor for a DL grant in a DCI format 1_2 message (e.g., a DL grant for potential PDSCH occurrences associated with the TDRA candidates 602a-h in the diagram 600 may be received in DCI format 1_2); determining that a starting symbol for determining at least one location of the at least one TDRA within the slot is configured based on at least one PDCCH monitoring occasion within the slot when the UE is configured to monitor for the DL grant in the DCI format 1_2 message (e.g., in the diagram 600, TDRA candidates 602c-e and 602f-h may have respective starting symbols defined from the first and second PDCCH monitoring occasion 604a-b); and determining that the at least one TDRA candidate has more than one possible location within the slot when the UE determines that the starting symbol for determining the at least one location of the at least one TDRA within the slot is configured based on the at least one PDCCH monitoring occasion within the slot (e.g., in the diagram 600, the last three entries of the TDRA table 606 have more than one possible location within the slot based on the two PDCCH monitoring occasions 604a-b). Configuration of the UE may be performed through a RRC parameter.

In further aspects, the determination that the at least one TDRA candidate has more than one possible location within the slot may be further base on determining that there is a plurality of PDCCH monitoring occasions within the slot in which a DCI format 1_2 message can be received. For example, referring to FIG. 6, the diagram 600 includes two PDCCH monitoring occasions 604a-b in which a DCI format 1_2 message may be received. In still further aspects, the determination that the at least one TDRA candidate has more than one possible location within the slot may be further base on determining that a $K_0$ slot offset associated with each of the at least one TDRA candidate is equal to 0. For example, referring to FIG. 6, the TDRA table 606 of the diagram 600 includes 4 TDRA entries that have a slot offset of $K_0=0$.

At 904, the UE may determine a number of TDRA candidates corresponding to additional locations of the at least one TDRA candidate that are fully contained within the slot. For example, referring to FIG. 6, the UE may determine that 3 TDRA candidates 602f-h defined with respect to the second PDCCH monitoring occasion 604b and fully contained within the slot may correspond to additional locations of the TDRA candidates 602c-e. The number of PDCCH monitoring occasions within the slot may include a first PDCCH monitoring occasion 604a and at least one subsequent PDCCH monitoring occasion (e.g., the second PDCCH monitoring occasion 604b), where the additional locations (e.g., 602f-h) of the at least one TDRA candidate 602c-e may correspond to a SLIV defined from a start of the at least one subsequent PDCCH monitoring occasion (e.g., the SLIV may be defined relative to symbol 7 of the diagram 600 for the second PDCCH monitoring occasion 604b). Hence, the number of PDCCH monitoring occasions within the slot may include a first PDCCH monitoring occasion at a first starting symbol $S_0>0$, where the additional locations of the at least one TDRA candidate (e.g., 602f-h) within the slot each correspond to a second starting symbol equal to $S_0$ plus a starting symbol S of the at least one TDRA candidate. In aspects, the first starting symbol $S_0>0$ and the second starting symbol $S_0+S$ may correspond to a same symbol when S=0. In an example, a starting symbol of the first PDCCH monitoring occasion may correspond to S=0 and a starting symbol of the second PDCCH monitoring occasion may correspond to S>0. In other examples, the starting symbols of both the first PDCCH monitoring occasion and the second PDCCH monitoring occasion may each correspond to S>0.

At 906, the UE may determine a total number of non-overlapping TDRA candidates within the slot based on a determined total number of TDRA candidates. For example, referring to FIG. 6, the UE may determine that there are 8 total TDRA candidates 602a-h in the diagram 600 and that up to 4 of the TDRA candidates (e.g., 602c, 602d, 602f, and 602g) are non-overlapping within the slot. Additionally, HARQ-ACK feedback for the TDRA candidates 602a-h may be generated to include x bits, where x is equal to the determined total number of non-overlapping TDRA candidates (e.g., the diagram 600 includes 4 bits that respectively correspond to the 4 non-overlapping TDRA candidates 602c, 602d, 602f, and 602g).

At 908, the UE may receive a PDSCH in each of one or more TDRA candidates of the set of TDRA candidates. For example, referring to FIG. 6, the UE may receive a PDSCH in each of the TDRA candidates corresponding to ($K_0=0$, S=2, L=4), ($K_0=0$, S=0, L=2), and/or ($K_0=0$, S=2, L=7), as the multiple locations that respectively correspond to each of such TDRA candidates is non-overlapping. Additionally, HARQ-ACK feedback may be generated by the UE based on the received PDSCH in the one or more TDRA candidates 602a-h.

At 910, the UE may generate the HARQ-ACK feedback based on the determination that the at least one TDRA candidate has more than one possible location within a slot. For example, referring to FIG. 6, HARQ-ACK feedback may be generated based on the TDRA candidates corresponding to ($K_0=0$, S=2, L=4), ($K_0=0$, S=0, L=2), and ($K_0=0$, S=2, L=7) having more than one possible location in the slot. The HARQ-ACK feedback may be based on a Type 1 HARQ-ACK codebook.

The generation of the HARQ-ACK feedback may be further based on: determining a number of PDCCH monitoring occasions within the slot (e.g., the UE may determine that there are two PDCCH monitoring occasions 604*a-b* in the diagram 600); determining, based on the number of PDCCH monitoring occasions, a first number of TDRA candidates of the at least one TDRA candidate that has more than one possible location within the slot (e.g., the UE may determine that 3 of the TDRA candidates 602*c-e* defined via the TDRA table 606 have more than one possible location in the slot of the diagram 600); and determining a total number of TDRA candidates within the slot, the total number of TDRA candidates within the slot including the determined first number of TDRA candidates within the slot, a second number of TDRA candidates corresponding to additional locations of the at least one TDRA candidate within the slot, and a third number of TDRA candidates with one possible location within the slot, where the HARQ-ACK feedback is generated based on the determined total number of TDRA candidates (e.g., the UE may determine that there are 8 total TDRA candidates 602*a-h* in the diagram 600 based on the 2 TDRA Candidates 602*a-b* with one possible location, the 3 TDRA candidates 602*c-e* with more than one possible location, and the 3 additional TDRA candidates 602*f-h* that correspond to the more than one possible location).

At 912, the UE may transmit the generated HARQ-ACK feedback. For example, referring to FIG. 6, the HARQ-ACK feedback generated based on the diagram 600 may be transmitted from the UE to a base station (e.g., transmitted from the UE 104 to the base station 102).

Figure 10:
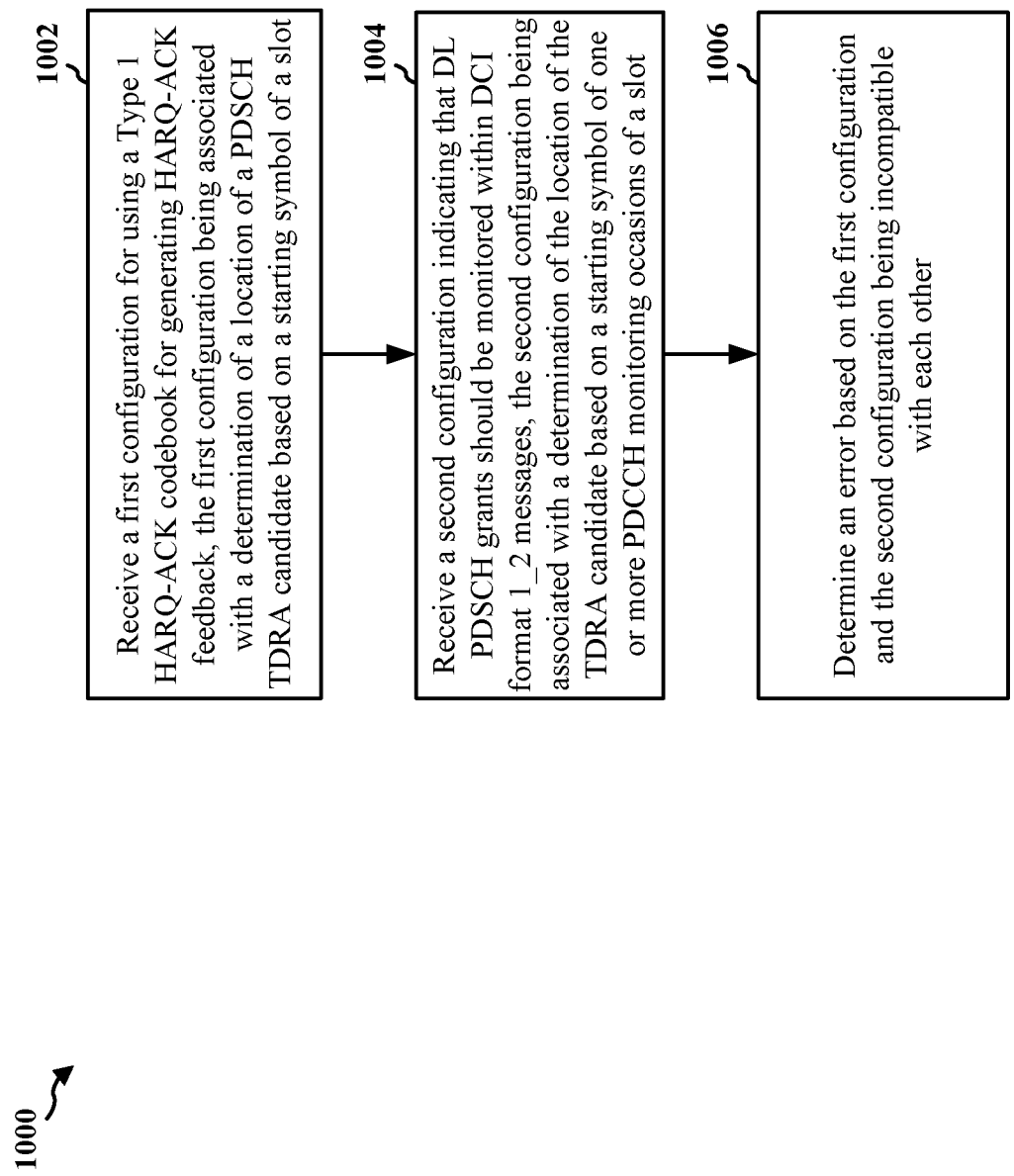
FIG. 10 is a flowchart for a method of wireless communication at a UE.

FIG. 10 is a flowchart 1000 of a method of wireless communication. The method may be performed by a UE 104, which may include the memory 360 and which may be the entire UE 104 or a component of the UE 104, such as the TX processor 368, the RX processor 356, and/or the controller/processor 359.

At 1002, the UE may receive a first configuration for using a Type 1 HARQ-ACK codebook for generating HARQ-ACK feedback, the first configuration being associated with a determination of a location of a PDSCH TDRA candidate based on a starting symbol of a slot. For example, referring to FIG. 4, the locations of the PDSCH TDRA candidates 0-6 may be defined based on a starting symbol of the slot.

At 1004, the UE may receive a second configuration indicating that DL PDSCH grants should be monitored within DCI format 1_2 messages, the second configuration being associated with a determination of the location of the TDRA candidate based on a starting symbol of one or more PDCCH monitoring occasions of a slot. For example, referring to FIG. 6, the locations of the TDRA candidates 602*a-h* may be based on starting symbol locations of the respective monitoring occasions 604*a-b* included in the slot.

At 1006, the UE may determine an error based on the first configuration and the second configuration being incompatible with each other. For example, the UE 104 may not be expected to be configured with a reference location for the PDSCH resource allocation for DCI format 1_2 and the Type 1 HARQ-ACK codebook at the same time for generating the feedback to the base station 102.

Figure 11:
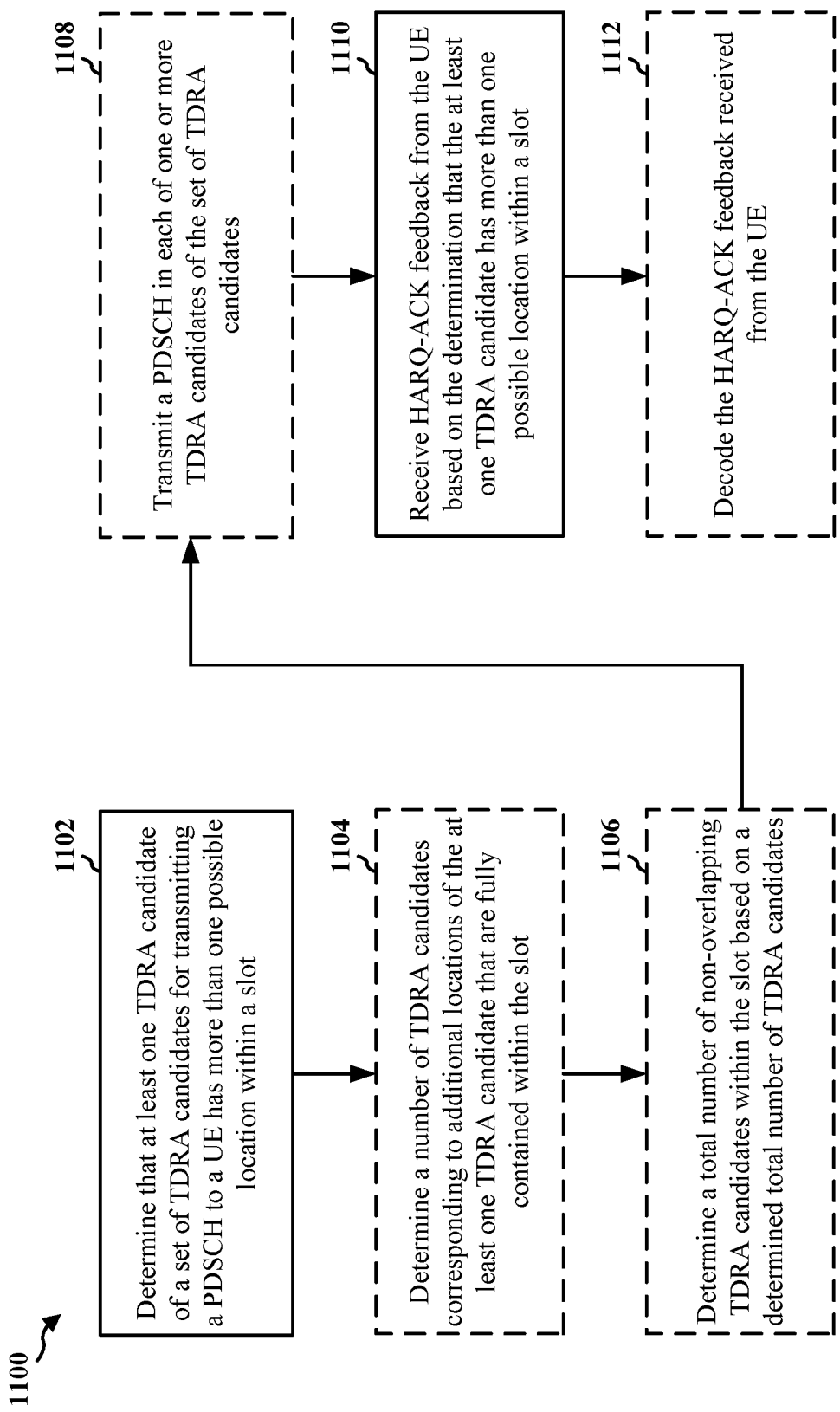
FIG. 11 is a flowchart for a method of wireless communication at a base station.

FIG. 11 is a flowchart 1100 of a method of wireless communication. The method may be performed by a base station 102, which may include the memory 376 and which may be the entire base station 102 or a component of the base station 102, such as the TX processor 316, the RX processor 370, and/or the controller/processor 375.

At 1102, the base station may determine that at least one TDRA candidate of a set of TDRA candidates for transmitting a PDSCH to a UE has more than one possible location within a slot. For example, referring to FIG. 6, the TDRA candidates 602*c-e* and 602*f-h* included in the diagram 600 may be defined with respect to a start of the first monitoring occasion 604*a* at symbol 0 and with respect to a start of the second monitoring occasion 604*b* at symbol 7.

The determination that the at least one TDRA candidate has more than one possible location within the slot may be further based on: determining that the UE is configured to monitor for a DL grant in a DCI format 1_2 message (e.g., a DL grant for potential PDSCH occurrences associated with the TDRA candidates 602*a-h* in the diagram 600 may be transmitted in DCI format 1_2); determining that a starting symbol for determining at least one location of the at least one TDRA within the slot is configured based on at least one PDCCH monitoring occasion within the slot when the UE is determined to be configured to monitor for the DL grant in the DCI format 1_2 message (e.g., in the diagram 600, TDRA candidates 602*c-e* and 602*f-h* may have respective starting symbols defined from the first and second PDCCH monitoring occasion 604*a-b*); and determining that the at least one TDRA candidate has more than one possible location within the slot when the starting symbol for determining the at least one location of the at least one TDRA within the slot is configured based on the at least one PDCCH monitoring occasion within the slot (e.g., in the diagram 600, the last three entries of the TDRA table 606 have more than one possible location within the slot based on the two PDCCH monitoring occasions 604*a-b*). The base station may configure the UE through a RRC parameter.

In further aspects, the determination that the at least one TDRA candidate has more than one possible location within the slot may be further base on determining that there is a plurality of PDCCH monitoring occasions within the slot in which a DCI format 1_2 message can be transmitted. For example, referring to FIG. 6, the diagram 600 includes two PDCCH monitoring occasions 604*a-b* in which a DCI format 1_2 message may be transmitted. In still further aspects, the determination that the at least one TDRA candidate has more than one possible location within the slot may be further base on determining that a $K_0$ slot offset associated with each of the at least one TDRA candidate is equal to 0. For example, referring to FIG. 6, the TDRA table 606 of the diagram 600 includes 4 TDRA entries that have a slot offset of $K_0=0$.

At 1104, the base station may determine a number of TDRA candidates corresponding to additional locations of the at least one TDRA candidate that are fully contained within the slot. For example, referring to FIG. 6, the base station may determine that 3 TDRA candidates 602*f-h* defined with respect to the second PDCCH monitoring occasion 604*b* and fully contained within the slot may correspond to additional locations of the TDRA candidates 602*c-e*. The number of PDCCH monitoring occasions within the slot may include a first PDCCH monitoring occasion 604*a* and at least one subsequent PDCCH monitoring occasion (e.g., the second PDCCH monitoring occasion 604*b*), where the additional locations (e.g., 602*f-h*) of the at least one TDRA candidate 602*c-e* may correspond to a SLIV defined from a start of the at least one subsequent PDCCH monitoring occasion (e.g., the SLIV may be defined relative to symbol 7 of the diagram 600 for the second PDCCH monitoring occasion 604*b*). Hence, the number of PDCCH monitoring occasions within the slot may include a first PDCCH monitoring occasion at a first starting symbol $S_0>0$, where the additional locations of the at least one TDRA candidate (e.g., 602*f-h*) within the slot each correspond to a second starting symbol equal to $S_0$ plus a starting symbol S of the at least one TDRA candidate. In aspects, the first starting symbol $S_0>0$ and the second starting symbol $S_0+S$ may correspond to a same symbol when $S=0$. In an example, a starting symbol of the first PDCCH monitoring occasion may correspond to $S=0$ and a starting symbol of the second PDCCH monitoring occasion may correspond to $S>0$. In other examples, the starting symbols of both the first PDCCH monitoring occasion and the second PDCCH monitoring occasion may each correspond to $S>0$.

At 1106, the base station may determine a total number of non-overlapping TDRA candidates within the slot based on a determined total number of TDRA candidates. For example, referring to FIG. 6, the base station may determine that there are 8 total TDRA candidates 602*a-h* in the diagram 600 and that up to 4 of the TDRA candidates (e.g., 602*c*, 602*d*, 602*f*, and 602*g*) are non-overlapping within the slot. Additionally, HARQ-ACK feedback for the TDRA candidates 602*a-h* may be received via x bits, where x is equal to the determined total number of non-overlapping TDRA candidates (e.g., the diagram 600 includes 4 bits that respectively correspond to the 4 non-overlapping TDRA candidates 602*c*, 602*d*, 602*f*, and 602*g*).

At 1108, the base station may transmit a PDSCH in each of one or more TDRA candidates of the set of TDRA candidates. For example, referring to FIG. 6, the base station may transmit a PDSCH in each of the TDRA candidates corresponding to ($K_0=0$, $S=2$, $L=4$), ($K_0=0$, $S=0$, $L=2$), and/or ($K_0=0$, $S=2$, $L=7$), as the multiple locations that respectively correspond to each of such TDRA candidates is non-overlapping. Additionally, HARQ-ACK feedback may be received by the base station based on the transmitted PDSCH in the one or more TDRA candidates 602*a-h*.

At 1110, the base station may receive the HARQ-ACK feedback from the UE based on the determination that the at least one TDRA candidate has more than one possible location within a slot. For example, referring to FIG. 6, HARQ-ACK feedback may be received from the UE based on the TDRA candidates corresponding to ($K_0=0$, $S=2$, $L=4$), ($K_0=0$, $S=0$, $L=2$), and ($K_0=0$, $S=2$, $L=7$) having more than one possible location in the slot. The HARQ-ACK feedback may be based on a Type 1 HARQ-ACK codebook.

The reception of the HARQ-ACK feedback may be further based on: determining a number of PDCCH monitoring occasions within the slot (e.g., the base station may determine that there are two PDCCH monitoring occasions 604*a-b* in the diagram 600); determining, based on the number of PDCCH monitoring occasions, a first number of TDRA candidates of the at least one TDRA candidate that has more than one possible location within the slot (e.g., the base station may determine that 3 of the TDRA candidates 602*c-e* defined via the TDRA table 606 have more than one possible location in the slot of the diagram 600); and determining a total number of TDRA candidates within the slot, the total number of TDRA candidates within the slot including the determined first number of TDRA candidates within the slot, a second number of TDRA candidates corresponding to additional locations of the at least one TDRA candidate within the slot, and a third number of TDRA candidates with one possible location within the slot, where the HARQ-ACK feedback is received based on the determined total number of TDRA candidates (e.g., the base station may determine that there are 8 total TDRA candidates 602*a-h* in the diagram 600 based on the 2 TDRA candidates 602*a-b* with one possible location, the 3 TDRA candidates 602*c-e* with more than one possible location, and the 3 additional TDRA candidates 602*f-h* that correspond to the more than one possible location).

At 1112, the base station may decode the HARQ-ACK feedback received from the UE. For example, referring to FIG. 8, the base station 804 may decode, at 818, the HARQ-ACK feedback received, at 816, from the UE 802.

Figure 12:
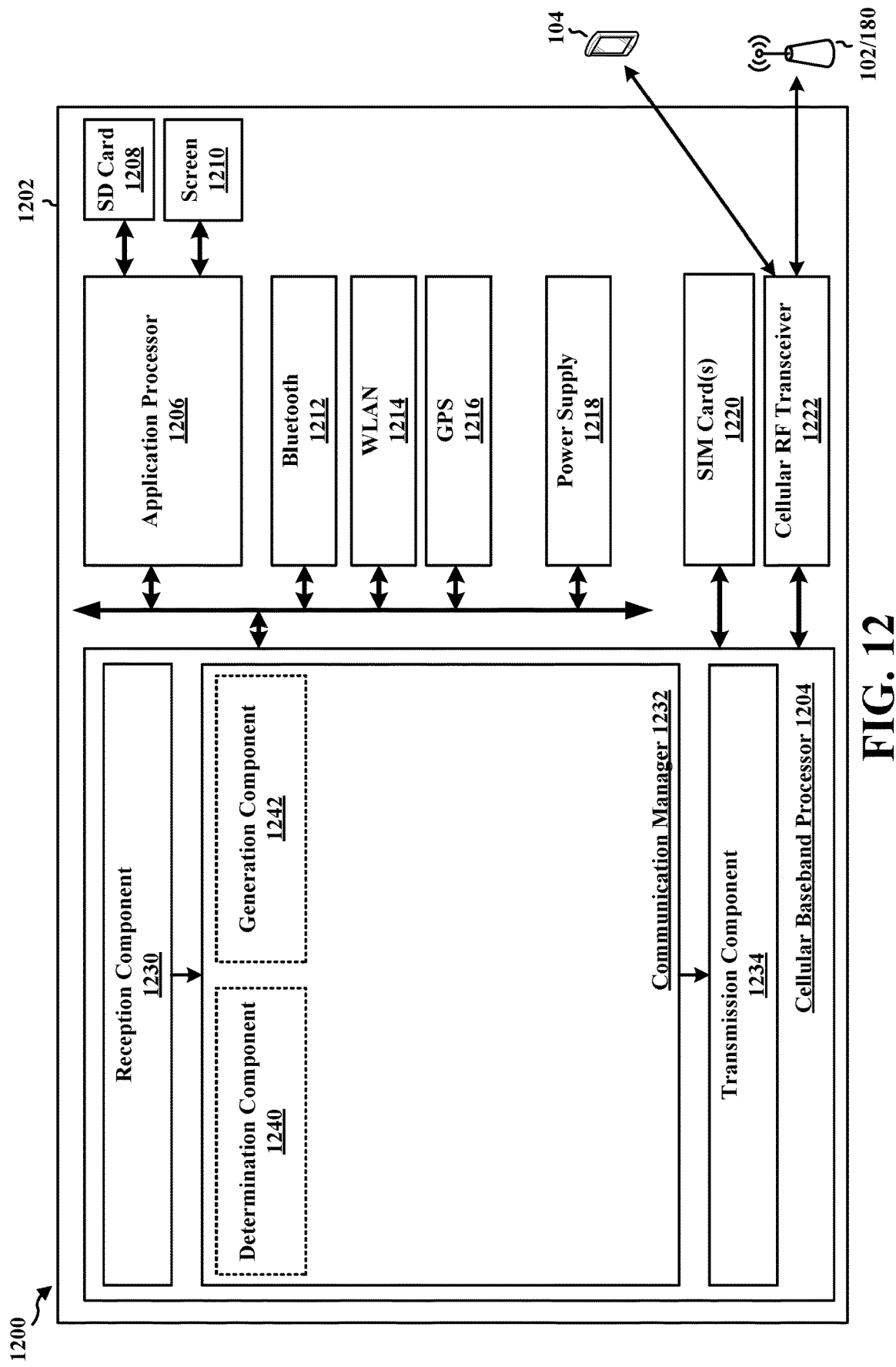
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a determination component 1240 that is configured, e.g., as described in connection with 902, 904, 906, and 1006, to determine that at least one TDRA candidate of a set of TDRA candidates for receiving a PDSCH has more than one possible location within a slot; to determine a number of TDRA candidates corresponding to additional locations of the at least one TDRA candidate that are fully contained within the slot; to determine a total number of non-overlapping TDRA candidates within the slot based on a determined total number of TDRA candidates; and to determine an error based on the first configuration and the second configuration being incompatible with each other. The communication manager 1232 further includes a generation component 1242 that is configured, e.g., as described in connection with 910, to generate HARQ-ACK feedback based on the determination that the at least one TDRA candidate has more than one possible location within a slot.

The reception component 1230 is configured, e.g., as described in connection with 908, 1002, and 1004, to receive a PDSCH in each of one or more TDRA candidates of the set of TDRA candidates; to receive a first configuration for using a Type 1 HARQ-ACK codebook for generating HARQ-ACK feedback, the first configuration being associated with a determination of a location of a PDSCH TDRA candidate based on a starting symbol of a slot; and to receive a second configuration indicating that DL PDSCH grants should be monitored within DCI format 1_2 messages, the second configuration being associated with a determination of the location of the TDRA candidate based on a starting symbol of one or more PDCCH monitoring occasions of a slot. The transmission component 1234 is configured, e.g., as described in connection with 912 to transmit the generated HARQ-ACK feedback.

The apparatus may include additional components that perform each of the blocks of the algorithm in the aforementioned flowcharts of FIGS. 9-10. As such, each block in the aforementioned flowcharts of FIGS. 9-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for determining that at least one TDRA candidate of a set of TDRA candidates for receiving a PDSCH has more than one possible location within a slot; and means for generating HARQ-ACK feedback based on the determination that the at least one TDRA candidate has more than one possible location within the slot. The apparatus 1202 further includes means for receiving a PDSCH in each of one or more TDRA candidates of the set of TDRA candidates, where the HARQ-ACK feedback is generated based on the received PDSCH in the one or more TDRA candidates; and means for transmitting the generated HARQ-ACK feedback. The apparatus 1202 further includes means for determining a total number of non-overlapping TDRA candidates within the slot based on the determined total number of TDRA candidates, where the HARQ-ACK feedback is generated to include x bits, where x is equal to the determined total number of non-overlapping TDRA candidates. The apparatus 1202 further includes means for determining the second number of TDRA candidates corresponding to the additional locations of the at least one TDRA candidate that are fully contained within the slot.

In aspects, the means for determining that the at least one TDRA candidate has more than one possible location within the slot is further configured to: determine that the UE is configured to monitor for a DL grant in a DCI format 1_2 message; to determine that a starting symbol for determining at least one location of the at least one TDRA within the slot is configured based on at least one PDCCH monitoring occasion within the slot when the UE is configured to monitor for the DL grant in the DCI format 1_2 message; and to determine that the at least one TDRA candidate has more than one possible location within the slot when the UE determines that the starting symbol for determining the at least one location of the at least one TDRA within the slot is configured based on the at least one PDCCH monitoring occasion within the slot. In further aspects, the means for determining that the at least one TDRA candidate has more than one possible location within the slot is further configured to determine that there is a PDCCH monitoring occasions within the slot in which a DCI format 1_2 message can be received. In still further aspects, the means for determining that the at least one TDRA candidate has more than one possible location within the slot is further configured to determine that a $K_0$ slot offset associated with each of the at least one TDRA candidate is equal to 0. In yet further aspects, the means for generating the HARQ-ACK feedback is further configured to: determine a number of PDCCH monitoring occasions within the slot; to determine, based on the number of PDCCH monitoring occasions, a first number of TDRA candidates of the at least one TDRA candidate that has more than one possible location within the slot; and to determine a total number of TDRA candidates within the slot, the total number of TDRA candidates within the slot including the determined first number of TDRA candidates within the slot, a second number of TDRA candidates corresponding to additional locations of the at least one TDRA candidate within the slot, and a third number of TDRA candidates with one possible location within the slot, where the HARQ-ACK feedback is generated based on the determined total number of TDRA candidates.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a determination component 1340 that is configured, e.g., as described in connection with 1102, 1104, and 1106, to determine that at least one TDRA candidate of a set of TDRA candidates for transmitting a PDSCH to a UE has more than one possible location within a slot; determine a number of TDRA candidates corresponding to additional locations of the at least one TDRA candidate that are fully contained within the slot; and to determine a total number of non-overlapping TDRA candidates within the slot based on a determined total number of TDRA candidates. The communication manager 1332 further includes a decoder component 1342 that is configured, e.g., as described in connection with 1112, to decode the HARQ-ACK feedback received from the UE. The transmission component 1334 is configured, e.g., as described in connection with 1108, to transmit a PDSCH in each of one or more TDRA candidates of the set of TDRA candidates. The reception component 1330 is configured, e.g., as described in connection with 1110, to receive HARQ-ACK feedback from the UE based on the determination that the at least one TDRA candidate has more than one possible location within a slot.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for determining that at least one TDRA candidate of a set of TDRA candidates for transmitting a PDSCH to a UE has more than one possible location within a slot; and means for receiving HARQ-ACK feedback from the UE based on the determination that the at least one TDRA candidate has more than one possible location within the slot. The apparatus 1302 further includes means for transmitting a PDSCH in each of one or more TDRA candidates of the set of TDRA candidates, where the HARQ-ACK feedback is received based on the transmitted PDSCH in the one or more TDRA candidates; and means for decoding the HARQ-ACK feedback received from the UE. The apparatus 1302 further includes means for determining a total number of non-overlapping TDRA candidates within the slot based on the determined total number of TDRA candidates, where the HARQ-ACK feedback is received via x bits, where x is equal to the determined total number of non-overlapping TDRA candidates. The apparatus 1302 further includes means for determining the second number of TDRA candidates corresponding to the additional locations of the at least one TDRA candidate that are fully contained within the slot.

In aspects, the means for determining that the at least one TDRA candidate has more than one possible location within the slot is further configured to determine that the UE is configured to monitor for a DL grant in a DCI format 1_2 message; to determine that a starting symbol for determining at least one location of the at least one TDRA within the slot is configured based on at least one PDCCH monitoring occasion within the slot when the UE is determined to be configured to monitor for the DL grant in the DCI format 1_2 message; and to determine that the at least one TDRA candidate has more than one possible location within the slot when the starting symbol for determining the at least one location of the at least one TDRA within the slot is configured based on the at least one PDCCH monitoring occasion within the slot. In further aspects, the means for determining that the at least one TDRA candidate has more than one possible location within the slot is further configured to determine that there is a plurality of PDCCH monitoring occasions within the slot in which a DCI format 1_2 message can be transmitted. In still further aspects, the means for determining that the at least one TDRA candidate has more than one possible location within the slot is further configured to determine that a $K_0$ slot offset associated with each of the at least one TDRA candidate is equal to 0. In yet further aspects, the means for receiving the HARQ-ACK feedback is further configured to determine a number of PDCCH monitoring occasions within the slot; to determine, based on the number of PDCCH monitoring occasions, a first number of TDRA candidates of the at least one TDRA candidate that has more than one possible location within the slot; and to determine a total number of TDRA candidates within the slot, the total number of TDRA candidates within the slot including the determined first number of TDRA candidates within the slot, a second number of TDRA candidates corresponding to additional locations of the at least one TDRA candidate within the slot, and a third number of TDRA candidates with one possible location within the slot, where the HARQ-ACK feedback is received based on the determined total number of TDRA candidates.

The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, when constructing the Type 1 HARQ-ACK codebook based on DCI format 1_2 and a reference point that is not based on the start of the slot, the UE may determine all the potential PDSCH occurrences within the slot for each respective set of TDRA values based on a number of PDCCH monitoring occasions within the slot and corresponding TDRA candidates that utilize the PDCCH monitoring occasions as reference points. A maximum number of non-overlapping TDRA candidates within the slot may be identified to determine a maximum number of potential PDSCH occurrences within the slot. Each of the PDSCH occurrences may then be mapped to a corresponding bit in the Type 1 HARQ-ACK codebook.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: determining that at least one TDRA candidate of a set of TDRA candidates for receiving a PDSCH has more than one possible location within a slot; and generating HARQ-ACK feedback based on the determination that the at least one TDRA candidate has more than one possible location within the slot.

Aspect 2 is may be combined with aspect 1 and further includes receiving a PDSCH in each of one or more TDRA candidates of the set of TDRA candidates, where the HARQ-ACK feedback is generated based on the received PDSCH in the one or more TDRA candidates; and transmitting the generated HARQ-ACK feedback.

Aspect 3 may be combined with any of aspects 1-2 and includes that the HARQ-ACK feedback is based on a type 1 HARQ-ACK codebook.

Aspect 4 may be combined with any of aspects 1-3 and includes that the determining that the at least one TDRA candidate has more than one possible location within the slot further includes: determining that the UE is configured to monitor for a DL grant in a DCI format 1_2 message; determining that a starting symbol for determining at least one location of the at least one TDRA within the slot is configured based on at least one PDCCH monitoring occasion within the slot when the UE is configured to monitor for the DL grant in the DCI format 1_2 message; and determining that the at least one TDRA candidate has more than one possible location within the slot when the UE determines that the starting symbol for determining the at least one location of the at least one TDRA within the slot is configured based on the at least one PDCCH monitoring occasion within the slot.

Aspect 5 may be combined with any of aspects 1-4 and includes that the configuration is through a RRC parameter.

Aspect 6 may be combined with any of aspects 1-5 and includes that the determining that the at least one TDRA candidate has more than one possible location within the slot further includes determining that there is a plurality of PDCCH monitoring occasions within the slot in which a DCI format 1_2 message can be received.

Aspect 7 may be combined with any of aspects 1-6 and includes that the determining that the at least one TDRA candidate has more than one possible location within the slot further includes determining that a $K_0$ slot offset associated with each of the at least one TDRA candidate is equal to 0.

Aspect 8 may be combined with any of aspects 1-7 and includes that the generating the HARQ-ACK feedback further includes: determining a number of PDCCH monitoring occasions within the slot; determining, based on the number of PDCCH monitoring occasions, a first number of TDRA candidates of the at least one TDRA candidate that has more than one possible location within the slot; and determining a total number of TDRA candidates within the slot, the total number of TDRA candidates within the slot including the determined first number of TDRA candidates within the slot, a second number of TDRA candidates corresponding to additional locations of the at least one TDRA candidate within the slot, and a third number of TDRA candidates with one possible location within the slot, where the HARQ-ACK feedback is generated based on the determined total number of TDRA candidates.

Aspect 9 may be combined with any of aspects 1-8 and further includes determining a total number of non-overlapping TDRA candidates within the slot based on the determined total number of TDRA candidates, where the HARQ-ACK feedback is generated to include x bits, where x is equal to the determined total number of non-overlapping TDRA candidates.

Aspect 10 may be combined with any of aspects 1-9 and further includes determining the second number of TDRA candidates corresponding to the additional locations of the at least one TDRA candidate that are fully contained within the slot.

Aspect 11 may be combined with any of aspects 1-10 and further includes that the number of PDCCH monitoring occasions within the slot includes a first PDCCH monitoring occasion at a first starting symbol $S_0 > 0$, the additional locations of the at least one TDRA candidate within the slot each corresponding to a second starting symbol equal to $S_0$ plus a starting symbol S of the at least one TDRA candidate.

Aspect 12 is a method of wireless communication at a base station, comprising: determining that at least one TDRA candidate of a set of TDRA candidates for transmitting a PDSCH to a UE has more than one possible location within a slot; and receiving HARQ-ACK feedback from the UE based on the determination that the at least one TDRA candidate has more than one possible location within the slot.

Aspect 13 may be combined with aspect 12 and further includes transmitting a PDSCH in each of one or more TDRA candidates of the set of TDRA candidates, where the HARQ-ACK feedback is received based on the transmitted PDSCH in the one or more TDRA candidates; and decoding the HARQ-ACK feedback received from the UE.

Aspect 14 may be combined with any of aspects 12-13 and includes that the HARQ-ACK feedback is based on a type 1 HARQ-ACK codebook.

Aspect 15 may be combined with any of aspects 12-14 and includes that determining that the at least one TDRA candidate has more than one possible location within the slot further includes: determining that the UE is configured to monitor for a DL grant in a DCI format 1_2 message; determining that a starting symbol for determining at least one location of the at least one TDRA within the slot is configured based on at least one PDCCH monitoring occasion within the slot when the UE is determined to be configured to monitor for the DL grant in the DCI format 1_2 message; and determining that the at least one TDRA candidate has more than one possible location within the slot when the starting symbol for determining the at least one location of the at least one TDRA within the slot is configured based on the at least one PDCCH monitoring occasion within the slot.

Aspect 16 may be combined with any of aspects 12-15 and includes that the configuration is through a RRC parameter.

Aspect 17 may be combined with any of aspects 12-16 and includes that determining that the at least one TDRA candidate has more than one possible location within the slot further includes determining that there is a plurality of PDCCH monitoring occasions within the slot in which a DCI format 1_2 message can be transmitted.

Aspect 18 may be combined with any of aspects 12-17 and includes that determining that the at least one TDRA candidate has more than one possible location within the slot further includes determining that a $K_0$ slot offset associated with each of the at least one TDRA candidate is equal to 0.

Aspect 19 may be combined with any of aspects 12-18 and includes that receiving the HARQ-ACK feedback further includes: determining a number of PDCCH monitoring occasions within the slot; determining, based on the number of PDCCH monitoring occasions, a first number of TDRA candidates of the at least one TDRA candidate that has more than one possible location within the slot; and determining a total number of TDRA candidates within the slot, the total number of TDRA candidates within the slot including the determined first number of TDRA candidates within the slot, a second number of TDRA candidates corresponding to additional locations of the at least one TDRA candidate within the slot, and a third number of TDRA candidates with one possible location within the slot, where the HARQ-ACK feedback is received based on the determined total number of TDRA candidates.

Aspect 20 may be combined with any of aspects 12-19 and further includes determining a total number of non-overlapping TDRA candidates within the slot based on the determined total number of TDRA candidates, where the HARQ-ACK feedback is received via x bits, where x is equal to the determined total number of non-overlapping TDRA candidates.

Aspect 21 may be combined with any of aspects 12-20 and further includes determining the second number of TDRA candidates corresponding to the additional locations of the at least one TDRA candidate that are fully contained within the slot.

Aspect 22 may be combined with any of aspects 12-21 and includes that the number of PDCCH monitoring occasions within the slot includes a first PDCCH monitoring occasion at a first starting symbol $S_0>0$, the additional locations of the at least one TDRA candidate within the slot each corresponding to a second starting symbol equal to $S_0$ plus a starting symbol S of the at least one TDRA candidate.

Aspect 23 is an apparatus for wireless communication including at least one processor coupled to a memory and configured to implement a method as in any of aspects 1-22.

Aspect 24 is an apparatus for wireless communication including means for implementing a method as in any of aspects 1-22.

Aspect 25 is a non-transitory computer-readable storage medium storing computer executable code, the code when executed by at least one processor causes the at least one processor to implement a method as in any of aspects 1-22.

What is claimed is:

1. A method of wireless communication at a user equipment (UE), comprising:
   determining that at least one time-domain resource allocation (TDRA) candidate of a set of TDRA candidates for receiving a physical downlink shared channel (PDSCH) from a base station has more than one possible location within a slot; and
   generating hybrid automatic repeat request (HARQ) acknowledgement (ACK) (HARQ-ACK) feedback based on the determination that the at least one TDRA candidate has more than one possible location within the slot,
   wherein the HARQ-ACK feedback is based on a plurality of TDRA candidates that include a first number of TDRA candidates of the at least one TDRA candidate that has more than one possible location within the slot and a second number of TDRA candidates corresponding to an additional location of the at least one TDRA candidate within the slot.

2. The method of claim 1, further comprising:
   receiving a PDSCH in each of one or more TDRA candidates of the set of TDRA candidates, wherein the HARQ-ACK feedback is generated based on the PDSCH in the one or more TDRA candidates; and
   transmitting the generated HARQ-ACK feedback to the base station.

3. The method of claim 1, wherein the HARQ-ACK feedback is based on a type 1 HARQ-ACK codebook (CB).

4. The method of claim 1, wherein the determining that the at least one TDRA candidate has more than one possible location within the slot comprises:
   determining that the UE is configured to monitor for a downlink (DL) grant in a DL control information (DCI) format 1_2 message;
   determining that a starting symbol for determining at least one location of the at least one TDRA within the slot is configured based on at least one physical downlink control channel (PDCCH) monitoring occasion within the slot when the UE is configured to monitor for the DL grant in the DCI format 1_2 message; and
   determining that the at least one TDRA candidate has more than one possible location within the slot when the UE determines that the starting symbol for determining the at least one location of the at least one TDRA within the slot is configured based on the at least one PDCCH monitoring occasion within the slot.

5. The method of claim 4, wherein the UE is configured to monitor for the DL grant through a radio resource control (RRC) parameter.

6. The method of claim 4, wherein the determining that the at least one TDRA candidate has more than one possible location within the slot comprises determining that there is a plurality of PDCCH monitoring occasions within the slot in which a DCI format 1_2 message is configured to be received.

7. The method of claim 4, wherein the determining that the at least one TDRA candidate has more than one possible location within the slot comprises determining that a $K_0$ slot offset associated with each of the at least one TDRA candidate is equal to 0.

8. The method of claim 1, wherein the generating the HARQ-ACK feedback comprises:
   determining a number of physical downlink control channel (PDCCH) monitoring occasions within the slot;
   determining, based on the number of PDCCH monitoring occasions, the first number of TDRA candidates of the at least one TDRA candidate that has more than one possible location within the slot; and
   determining a total number of TDRA candidates within the slot, the total number of TDRA candidates within the slot including the first number of TDRA candidates within the slot, the second number of TDRA candidates corresponding to the additional location of the at least one TDRA candidate within the slot, and a third number of TDRA candidates with one possible location within the slot, wherein the HARQ-ACK feedback is generated based on the total number of TDRA candidates.

9. The method of claim 8, further comprising determining a total number of non-overlapping TDRA candidates within the slot based on the total number of TDRA candidates, wherein the HARQ-ACK feedback is generated to include x bits, where x is equal to the total number of non-overlapping TDRA candidates.

10. The method of claim 8, further comprising determining the second number of TDRA candidates corresponding to the additional location of the at least one TDRA candidate that are fully contained within the slot.

11. The method of claim 1, wherein a number of physical downlink control channel (PDCCH) monitoring occasions within the slot includes a first PDCCH monitoring occasion at a first starting symbol $S_0>0$, the additional location of the at least one TDRA candidate within the slot each corresponding to a second starting symbol equal to $S_0$ plus a starting symbol S of the at least one TDRA candidate.

12. A method of wireless communication at a base station, comprising:
    determining that at least one time-domain resource allocation (TDRA) candidate of a set of TDRA candidates for transmitting a physical downlink shared channel (PDSCH) to a user equipment (UE) has more than one possible location within a slot; and
    receiving hybrid automatic repeat request (HARD) acknowledgement (ACK) (HARQ-ACK) feedback from the UE based on the determination that the at least one TDRA candidate has more than one possible location within the slot,
        wherein the HARQ-ACK feedback is based on a plurality of TDRA candidates that include a first number of TDRA candidates of the at least one TDRA candidate that has more than one possible location within the slot and a second number of TDRA candidates corresponding to an additional location of the at least one TDRA candidate within the slot.

13. The method of claim 12, further comprising:
    transmitting a PDSCH in each of one or more TDRA candidates of the set of TDRA candidates, wherein the HARQ-ACK feedback is received based on the PDSCH in the one or more TDRA candidates; and
    decoding the HARQ-ACK feedback received from the UE.

14. The method of claim 12, wherein the HARQ-ACK feedback is based on a type 1 HARQ-ACK codebook (CB).

15. The method of claim 12, wherein the determining that the at least one TDRA candidate has more than one possible location within the slot comprises:
    determining that the UE is configured to monitor for a downlink (DL) grant in a DL control information (DCI) format 1_2 message;
    determining that a starting symbol for determining at least one location of the at least one TDRA within the slot is configured based on at least one physical downlink control channel (PDCCH) monitoring occasion within the slot when the UE is determined to be configured to monitor for the DL grant in the DCI format 1_2 message; and
    determining that the at least one TDRA candidate has more than one possible location within the slot when the starting symbol for determining the at least one location of the at least one TDRA within the slot is configured based on the at least one PDCCH monitoring occasion within the slot.

16. The method of claim 15, wherein the UE is configured to monitor for the DL grant through a radio resource control (RRC) parameter.

17. The method of claim 15, wherein the determining that the at least one TDRA candidate has more than one possible location within the slot comprises determining that there is a plurality of PDCCH monitoring occasions within the slot in which a DCI format 1_2 message is configured to be transmitted.

18. The method of claim 15, wherein the determining that the at least one TDRA candidate has more than one possible location within the slot comprises determining that a $K_0$ slot offset associated with each of the at least one TDRA candidate is equal to 0.

19. The method of claim 12, wherein receiving the HARQ-ACK feedback comprises:
    determining a number of physical downlink control channel (PDCCH) monitoring occasions within the slot;
    determining, based on the number of PDCCH monitoring occasions, the first number of TDRA candidates of the at least one TDRA candidate that has more than one possible location within the slot; and
    determining a total number of TDRA candidates within the slot, the total number of TDRA candidates within the slot including the first number of TDRA candidates within the slot, the second number of TDRA candidates corresponding to the additional location of the at least one TDRA candidate within the slot, and a third number of TDRA candidates with one possible location within the slot,
    wherein the HARQ-ACK feedback is received based on the total number of TDRA candidates.

20. The method of claim 19, further comprising determining a total number of non-overlapping TDRA candidates within the slot based on the total number of TDRA candidates, wherein the HARQ-ACK feedback is received via x bits, where x is equal to the total number of non-overlapping TDRA candidates.

21. The method of claim 19, further comprising determining the second number of TDRA candidates corresponding to the additional location of the at least one TDRA candidate that are fully contained within the slot.

22. The method of claim 12, wherein a number of physical downlink control channel (PDCCH) monitoring occasions within the slot includes a first PDCCH monitoring occasion at a first starting symbol $S_0>0$, the additional location of the at least one TDRA candidate within the slot each corresponding to a second starting symbol equal to $S_0$ plus a starting symbol S of the at least one TDRA candidate.

23. An apparatus for wireless communication at a user equipment (UE), comprising:
    a memory; and
    at least one processor coupled to the memory and configured to:
        determine that at least one time-domain resource allocation (TDRA) candidate of a set of TDRA candidates for receiving a physical downlink shared channel (PDSCH) from a base station has more than one possible location within a slot; and
        generate hybrid automatic repeat request (HARQ) acknowledgement (ACK) (HARQ-ACK) feedback based on the determination that the at least one TDRA candidate has more than one possible location within the slot,
            wherein the HARQ-ACK feedback is based on a plurality of TDRA candidates that include a first number of TDRA candidates of the at least one TDRA candidate that has more than one possible location within the slot and a second number of TDRA candidates corresponding to an additional location of the at least one TDRA candidate within the slot.

24. The apparatus of claim 23, wherein the at least one processor is further configured to:
receive a PDSCH in each of one or more TDRA candidates of the set of TDRA candidates, wherein the HARQ-ACK feedback is generated based on the PDSCH in the one or more TDRA candidates; and
transmit the generated HARQ-ACK feedback to the base station.

25. The apparatus of claim 23, wherein the HARQ-ACK feedback is based on a type 1 HARQ-ACK codebook (CB).

26. The apparatus of claim 23, wherein to determine that the at least one TDRA candidate has more than one possible location within the slot the at least one processor is further configured to:
determine that the UE is configured to monitor for a downlink (DL) grant in a DL control information (DCI) format 1_2 message;
determine that a starting symbol for determining at least one location of the at least one TDRA within the slot is configured based on at least one physical downlink control channel (PDCCH) monitoring occasion within the slot when the UE is configured to monitor for the DL grant in the DCI format 1_2 message; and
determine that the at least one TDRA candidate has more than one possible location within the slot when the UE determines that the starting symbol for determining the at least one location of the at least one TDRA within the slot is configured based on the at least one PDCCH monitoring occasion within the slot.

27. The apparatus of claim 26, wherein the UE is configured to monitor for the DL grant through a radio resource control (RRC) parameter.

28. The apparatus of claim 26, wherein to determine that the at least one TDRA candidate has more than one possible location within the slot the at least one processor is further configured to determine that there is a plurality of PDCCH monitoring occasions within the slot in which a DCI format 1_2 message is configured to be received.

29. The apparatus of claim 26, wherein to determine that the at least one TDRA candidate has more than one possible location within the slot the at least one processor is further configured to determine that a $K_0$ slot offset associated with each of the at least one TDRA candidate is equal to 0.

30. The apparatus of claim 23, wherein to generate the HARQ-ACK feedback the at least one processor is further configured to:
determine a number of physical downlink control channel (PDCCH) monitoring occasions within the slot;
determine, based on the number of PDCCH monitoring occasions, the first number of TDRA candidates of the at least one TDRA candidate that has more than one possible location within the slot; and
determine a total number of TDRA candidates within the slot, the total number of TDRA candidates within the slot including the first number of TDRA candidates within the slot, the second number of TDRA candidates corresponding to the additional location of the at least one TDRA candidate within the slot, and a third number of TDRA candidates with one possible location within the slot,
wherein the HARQ-ACK feedback is generated based on the total number of TDRA candidates.

31. The apparatus of claim 30, wherein the at least one processor is further configured to determine a total number of non-overlapping TDRA candidates within the slot based on the total number of TDRA candidates, wherein the HARQ-ACK feedback is generated to include x bits, where x is equal to the total number of non-overlapping TDRA candidates.

32. The apparatus of claim 30, wherein the at least one processor is further configured to determine the second number of TDRA candidates corresponding to the additional location of the at least one TDRA candidate that are fully contained within the slot.

33. The apparatus of claim 23, wherein a number of physical downlink control channel (PDCCH) monitoring occasions within the slot includes a first PDCCH monitoring occasion at a first starting symbol $S_0>0$, the additional location of the at least one TDRA candidate within the slot each corresponding to a second starting symbol equal to $S_0$ plus a starting symbol S of the at least one TDRA candidate.

34. An apparatus for wireless communication at a base station, comprising:
a memory; and
at least one processor coupled to the memory and configured to:
determine that at least one time-domain resource allocation (TDRA) candidate of a set of TDRA candidates for transmitting a physical downlink shared channel (PDSCH) to a user equipment (UE) has more than one possible location within a slot; and
receive hybrid automatic repeat request (HARQ) acknowledgement (ACK) (HARQ-ACK) feedback from the UE based on the determination that the at least one TDRA candidate has more than one possible location within the slot,
wherein the HARQ-ACK feedback is based on a plurality of TDRA candidates that include a first number of TDRA candidates of the at least one TDRA candidate that has more than one possible location within the slot and a second number of TDRA candidates corresponding to an additional location of the at least one TDRA candidate within the slot.

35. The apparatus of claim 34, wherein the at least one processor is further configured to:
transmit a PDSCH in each of one or more TDRA candidates of the set of TDRA candidates, wherein the HARQ-ACK feedback is received based on the PDSCH in the one or more TDRA candidates; and
decode the HARQ-ACK feedback received from the UE.

36. The apparatus of claim 34, wherein the HARQ-ACK feedback is based on a type 1 HARQ-ACK codebook (CB).

37. The apparatus of claim 34, wherein to determine that the at least one TDRA candidate has more than one possible location within the slot, the at least one processor is further configured to:
determine that the UE is configured to monitor for a downlink (DL) grant in a DL control information (DCI) format 1_2 message;
determine that a starting symbol for determining at least one location of the at least one TDRA within the slot is configured based on at least one physical downlink control channel (PDCCH) monitoring occasion within the slot when the UE is determined to be configured to monitor for the DL grant in the DCI format 1_2 message; and
determine that the at least one TDRA candidate has more than one possible location within the slot when the starting symbol for determining the at least one location of the at least one TDRA within the slot is configured based on the at least one PDCCH monitoring occasion within the slot.

38. The apparatus of claim 37, wherein the UE is configured to monitor for the DL grant through a radio resource control (RRC) parameter.

39. The apparatus of claim 37, wherein to determine that the at least one TDRA candidate has more than one possible location within the slot the at least one processor is further configured to determine that there is a plurality of PDCCH monitoring occasions within the slot in which a DCI format 1_2 message is configured to be transmitted.

40. The apparatus of claim 37, wherein to determine that the at least one TDRA candidate has more than one possible location within the slot the at least one processor is further configured to determine that a $K_0$ slot offset associated with each of the at least one TDRA candidate is equal to 0.

41. The apparatus of claim 34, wherein to receive the HARQ-ACK feedback the at least one processor is further configured to:
determine a number of physical downlink control channel (PDCCH) monitoring occasions within the slot;
determine, based on the number of PDCCH monitoring occasions, the first number of TDRA candidates of the at least one TDRA candidate that has more than one possible location within the slot; and
determine a total number of TDRA candidates within the slot, the total number of TDRA candidates within the slot including the first number of TDRA candidates within the slot, the second number of TDRA candidates corresponding to the additional location of the at least one TDRA candidate within the slot, and a third number of TDRA candidates with one possible location within the slot,
wherein the HARQ-ACK feedback is received based on the total number of TDRA candidates.

42. The apparatus of claim 41, wherein the at least one processor is further configured to determine a total number of non-overlapping TDRA candidates within the slot based on the total number of TDRA candidates, wherein the HARQ-ACK feedback is received via x bits, where x is equal to the total number of non-overlapping TDRA candidates.

43. The apparatus of claim 41, wherein the at least one processor is further configured to determine the second number of TDRA candidates corresponding to the additional location of the at least one TDRA candidate that are fully contained within the slot.

44. The apparatus of claim 34, wherein a number of physical downlink control channel (PDCCH) monitoring occasions within the slot includes a first PDCCH monitoring occasion at a first starting symbol $S_0>0$, the additional location of the at least one TDRA candidate within the slot each corresponding to a second starting symbol equal to $S_0$ plus a starting symbol S of the at least one TDRA candidate.

* * * * *